United States Patent
Bell et al.

(10) Patent No.: US 8,875,070 B2
(45) Date of Patent: Oct. 28, 2014

(54) BREAKING UP LONG-CHANNEL FIELD EFFECT TRANSISTOR INTO SMALLER SEGMENTS FOR RELIABILITY MODELING

(71) Applicant: LSI Corporation, San Jose, CA (US)

(72) Inventors: David Averill Bell, Lower Milford Township, PA (US); Bonnie E. Weir, Bronxville, NY (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/837,348

(22) Filed: Mar. 15, 2013

(65) Prior Publication Data

US 2014/0096094 A1  Apr. 3, 2014

Related U.S. Application Data

(60) Provisional application No. 61/709,237, filed on Oct. 3, 2012.

(51) Int. Cl.
*G06F 17/50* (2006.01)

(52) U.S. Cl.
CPC ........ *G06F 17/5036* (2013.01); *G06F 17/5009* (2013.01); *G06F 17/5081* (2013.01)
USPC ........... 716/103; 716/100; 716/101; 716/106; 716/109; 716/110; 716/111; 716/112; 716/132; 716/136

(58) Field of Classification Search
CPC ............ G06F 17/5045; G06F 17/5022; G06F 17/5068; G06F 2217/76
USPC ......... 716/100–101, 103, 106, 109, 110–112, 716/132, 136; 703/13–14
See application file for complete search history.

(56) References Cited

U.S. PATENT DOCUMENTS

| | | | |
|---|---|---|---|
| 6,933,731 B2 * | 8/2005 | Reddy et al. | 324/612 |
| 8,099,269 B2 * | 1/2012 | Topaloglu et al. | 703/14 |
| 8,248,095 B2 | 8/2012 | Noorlag et al. | |
| 8,266,572 B2 | 9/2012 | Kim et al. | |
| 2005/0086038 A1 * | 4/2005 | Reddy et al. | 703/15 |
| 2008/0077890 A1 * | 3/2008 | Hershenson et al. | 716/2 |
| 2009/0094013 A1 * | 4/2009 | Topaloglu et al. | 703/14 |
| 2009/0299716 A1 * | 12/2009 | Liu et al. | 703/13 |
| 2010/0038683 A1 * | 2/2010 | Shanware et al. | 257/204 |

(Continued)

OTHER PUBLICATIONS

White, Mark, et al., "Microelectronics Reliability: Physics-of-Failure based modeling and lifetime evaluation", 2008, JPL Publication 08-5 2/08. pp. 1-216.*

(Continued)

*Primary Examiner* — Stacy Whitmore

(57) ABSTRACT

A first MOS transistor has a channel length. Based on a parameter associated with the first MOS transistor, the first MOS transistor is selected to be simulated as at least a first transistor and a second transistor in series. The circuit is simulated with the first transistor and the second transistor in place of the first MOS transistor. Based on the results of the simulation, device degradations are calculated for the first transistor the second transistor. A degraded netlist is created. In the degraded netlist, the first transistor is degraded by a device degradation for the first transistor. The second transistor is degraded by a device degradation for the second transistor. The circuit is re-simulated with the first degraded transistor and the second degraded transistor in place of the first MOS transistor.

14 Claims, 26 Drawing Sheets

(56) References Cited

U.S. PATENT DOCUMENTS

| | | | |
|---|---|---|---|
| 2010/0299649 A1* | 11/2010 | Hershenson et al. | 716/135 |
| 2012/0266123 A1* | 10/2012 | Jain et al. | 716/112 |
| 2013/0056799 A1* | 3/2013 | Ishizu | 257/213 |
| 2014/0095126 A1* | 4/2014 | Weir et al. | 703/2 |
| 2014/0095127 A1* | 4/2014 | Weir et al. | 703/2 |
| 2014/0095139 A1* | 4/2014 | Weir et al. | 703/14 |
| 2014/0095140 A1* | 4/2014 | Weir et al. | 703/14 |
| 2014/0096098 A1* | 4/2014 | Weir et al. | 716/112 |

OTHER PUBLICATIONS

Mentor Graphics Corporation, Eldo User's Manual, Software Version 6.6_1 Release 2005.3, Mar. 2005, Wilsonville, Oregon, USA.

Celestry Design Technologies, Inc., RelXpert, The Solution for Circuit-Level Hot-Carrier/NBTI Simulation, Jun. 26, 2002, San Jose, CA, USA (downloaded Sep. 27, 2012).

Bernstein, Joseph B, Gurfinkel, Moshe, Li, Xiaojun, Walters, Jorg, Shapira, Yoram, Talmor, Michael, Electronic circuit reliability modeling, Dec. 6, 2005, Reliability Engineering Center, Mechanical Engineering Department, University of Maryland at College Park, MD, USA.

Pagey, Manish P., Hot-Carrier reliability simulation in aggressively scaled MOS Transistors, Dissertation, Graduate School of Vanderbilt University, Dec. 2003, Nashville, Tennessee, USA.

\* cited by examiner

```
┌─────────────────────────────────────────────────┐
│   DETERMINE A FIRST TOTAL MOS TRANSISTOR GATE   │
│   AREA HAVING A FIRST GATE DIELECTRIC THICKNESS │
│                      1302                        │
└─────────────────────────────────────────────────┘
                        │
┌ ─ ─ ─ ─ ─ ─ ─ ─ ─ ─ ─ ┼ ─ ─ ─ ─ ─ ─ ─ ─ ─ ─ ─ ┐
│  DETERMINE A SECOND TOTAL MOS TRANSISTOR GATE   │
│ AREA HAVING A SECOND GATE DIELECTRIC THICKNESS  │
│                      1306                        │
└ ─ ─ ─ ─ ─ ─ ─ ─ ─ ─ ─ ┬ ─ ─ ─ ─ ─ ─ ─ ─ ─ ─ ─ ┘
                        │
┌─────────────────────────────────────────────────┐
│   DETERMINE AN EXPECTED LIFETIME OF A FIRST MOS │
│  TRANSISTOR BASED ON THE FIRST TOTAL MOS TRANSISTOR │
│  GATE AREA HAVING A FIRST GATE DIELECTRIC THICKNESS, $V_{GB}$, │
│  A TEMPERATURE PARAMETER, THE LENGTH OF THE CHANNEL │
│   OF THE FIRST MOS TRANSISTOR, A DETERMINED GATE-TO- │
│  SOURCE VOLTAGE ($V_{GS}$), AND, A DETERMINED DRAIN-TO-SOURCE │
│                  VOLTAGE ($V_{DS}$)              │
│                      1310                        │
└─────────────────────────────────────────────────┘
                        │
┌─────────────────────────────────────────────────┐
│  DETERMINE AN EXPECTED LIFETIME OF THE INTEGRATED │
│  CIRCUIT BASED ON THE ON THE EXPECTED LIFETIME OF THE │
│  FIRST MOS TRANSISTOR, AND (IF APPLICABLE) THE EXPECTED │
│   LIFETIME OF THE SECOND MOS TRANSISTOR HAVING THE │
│        SECOND GATE DIELECTRIC THICKNESS          │
│                      1312                        │
└─────────────────────────────────────────────────┘
```

FIGURE 13

MEASURE, FOR A MOS INTEGRATED CIRCUIT FABRICATION PROCESS, A FIRST DEPENDENCE OF A SATURATION CURRENT ($I_{DSAT}$) DEGRADATION VERSUS GATE VOLTAGE ($V_{GS}$), THE FIRST DEPENDENCE INDICATIVE OF $I_{DSAT}$ DEGRADATION CAUSED BY HOT CARRIER INJECTION (HCI);
2102

MEASURE, FOR A MOS INTEGRATED CIRCUIT FABRICATION PROCESS, A SECOND DEPENDENCE OF A SATURATION CURRENT ($I_{DSAT}$) DEGRADATION VERSUS GATE VOLTAGE ($V_{GS}$), THE SECOND DEPENDENCE INDICATIVE OF $I_{DSAT}$ DEGRADATION CAUSED BY BIAS TEMPERATURE INSTABILITY (BTI);
2104

DETERMINE AN ARTIFICIAL HCI LIFETIME EQUATION THAT IS BASED ON THE SECOND DEPENDENCE SUBTRACTED FROM THE FIRST DEPENDENCE
2106

SIMULATE A CIRCUIT THAT INCLUDES A FIRST MOS TRANSISTOR
2108

BASED ON THE RESULTS OF THE SIMULATION OF THE CIRCUIT, AND THE ARTIFICIAL HCI LIFETIME EQUATION, DETERMINE AN $I_{DSAT}$ DEGRADATION FOR THE FIRST MOS TRANSISTOR
2110

FIGURE 21

DETERMINE A RECOVERY VOLTAGE THRESHOLD VALUE BASED ON A FIRST DEPENDENCE OF AN MOS TRANSISTOR CHARACTERISTIC PARAMETER DEGRADATION TO GATE VOLTAGE ($V_{GS}$) AT A LEVEL THAT CAUSES THE MOS TRANSISTOR CHARACTERISTIC PARAMETER DEGRADATION BY BIAS TEMPERATURE INSTABILITY (BTI) AND A SECOND DEPENDENCE OF THE MOS TRANSISTOR CHARACTERISTIC PARAMETER TO RECOVER BASED ON GATE VOLTAGE BEING AT BELOW THE RECOVERY VOLTAGE THRESHOLD
2502

SIMULATE A CIRCUIT THAT INCLUDES A FIRST MOS TRANSISTOR
2504

BASED ON THE RESULTS OF THE SIMULATION OF THE CIRCUIT, DETERMINE A BTI RECOVERY FACTOR BASED ON AN AMOUNT OF TIME THE $V_{GS}$ OF THE FIRST MOS TRANSISTOR IS BELOW THE RECOVERY VOLTAGE THRESHOLD VALUE
2506

FIGURE 25

BREAKING UP LONG-CHANNEL FIELD EFFECT TRANSISTOR INTO SMALLER SEGMENTS FOR RELIABILITY MODELING

BACKGROUND

In modern integrated circuits (ICs), Metal Oxide Semiconductor Field Effect Transistors (MOSFETs) are being constructed at sizes close to their physical limits. The scaling of these devices in order to accommodate the ever increasing demand for faster and more complex Integrated Circuits has resulted in increasingly high electric fields within these MOSFETs. These increased electric fields can contribute to reliability problems for the long term operation of these devices.

One such mechanism that causes reliability problem is hot carrier injection (HCI). Hot carrier injection is a phenomenon in solid-state electronic devices where an electron or a "hole" gains sufficient kinetic energy to overcome a potential barrier necessary to break an interface state. The term "hot" refers to the effective temperature used to model carrier velocity, not to the overall temperature of the device. Since the charge carriers can become trapped in the gate dielectric of a MOS transistor, the switching characteristics of the transistor can be permanently changed.

Another mechanism that causes reliability problems seen in integrated circuits results from time-dependent gate dielectric breakdown (or time dependent dielectric breakdown—TDDB). Time dependent dielectric breakdown is a failure mechanism in MOSFETs that occurs when the gate dielectric breaks down as a result of long-time application of relatively low electric field (as opposite to immediate breakdown, which is caused by strong electric field). The breakdown is caused by formation of a conducting path through the gate dielectric to substrate due to electron tunneling current. This typically occurs when MOSFETs are operated close to or beyond their specified operating voltages. Yet another mechanism that can cause reliability problems is bias temperature instability (BTI) (a.k.a., negative bias temperature instability—NBTI).

SUMMARY

An embodiment of the invention may therefore comprise a method for checking for reliability problems that includes receiving a netlist of a circuit having at least one MOS transistor. This netlist includes a first MOS transistor. This first MOS transistor has a channel length. Based on a parameter associated with the first MOS transistor, the first MOS transistor is selected to be simulated as at least a first transistor and a second transistor in series. The first transistor and the second transistor have a first channel length and a second channel length, respectively. The first channel length and the second channel length are both less than the channel length of the first MOS transistor. The circuit is simulated with the first transistor and the second transistor in place of the first MOS transistor. Based on the results of the simulation, device degradations are calculated for the first transistor and the second transistor. A degraded netlist is created. In the degraded netlist, the first transistor is degraded by a device degradation for the first transistor. The second transistor is degraded by a device degradation for the second transistor. The circuit is re-simulated with the first degraded transistor and the second degraded transistor in place of the first MOS transistor.

An embodiment of the invention may therefore further comprise a method for checking for reliability problems that includes selecting, from a plurality of MOS transistors specified by a first netlist of the circuit, a selected plurality of MOS transistors. A second netlist of the circuit is created. The second netlist created by replacing each of the selected plurality of MOS transistor with at least two MOS transistors in series. This second netlist has at least a first transistor and a second transistor in series in place of a first MOS transistor of the selected plurality of MOS transistors. The circuit is simulated using the second netlist. Based on the results of the simulation, a first degraded parameter associated with the first transistor and a second degraded parameter associated with the second transistor are calculated. A third netlist of the circuit is created. The third netlist has the same circuit topology as the second netlist. The third netlist uses the first degraded parameter for the first transistor and the second degraded parameter for the second transistor. The circuit is simulated using the third netlist.

BRIEF DESCRIPTION OF THE FIGURES

FIG. 13 is a flowchart illustrating a method of determining an expected lifetime of an integrated circuit.

FIG. 21 is a flowchart illustrating a method of calculating an expected saturation current degradation.

FIG. 25 is a flowchart illustrating a method of calculating a saturation current change.

DETAILED DESCRIPTION OF THE EMBODIMENTS

Figure 1:
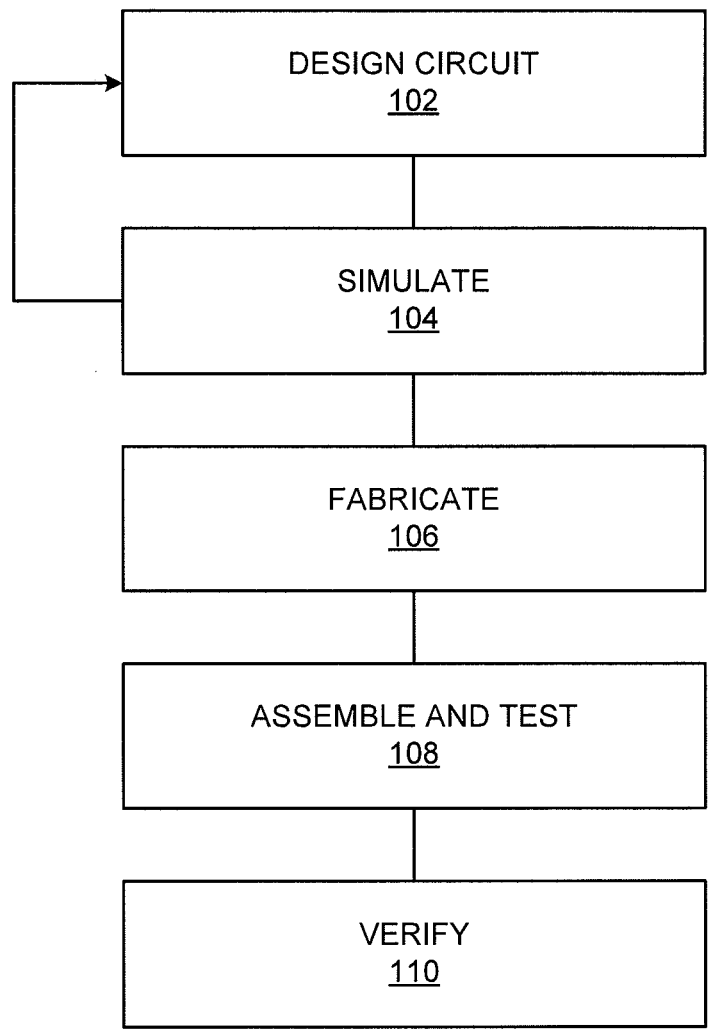
FIG. 1 is a flowchart illustrating a method of producing integrated circuits that meet reliability targets.

FIG. 1 is a flowchart illustrating a method of producing integrated circuits that meet reliability targets. As shown in FIG. 1, a circuit design (or integrated circuit design) that includes at least one Metal-oxide-semiconductor field effect transistor (a.k.a., MOSFET, FET, NFET, PFET, etc.) is produced (102). A reliability simulation of the circuit design is performed (104). If the reliability simulation in step 104 determines that the circuit design produced in step 102 meets a desired set of reliability criteria (e.g., expected lifetime before failure), a circuit corresponding to the circuit design produced in step 102 may be formed on a wafer during a wafer fabrication process (106). The fabricated circuit may then be verified (110). The fabricated circuit may then be verified by, for example, physical reliability tests such as burn-in. The reliability verifying methods according to example embodiments may enhance productivity by substantially reducing a defect occurrence during verification by detecting defects, problems, over-stress, low expected lifetimes, etc. the reliability simulation of step 104.

In particular, the reliability simulation may be based on voltage stress of direct current (DC) or alternating current (AC) component induced in an operation of the circuit design produced in step 102. More particularly, in the reliability simulation, voltage stress of an AC component may be applied to the transistors in the circuit design produced in step 102 in order to evaluate stresses or conditions that the MOS transistors will likely face during operation.

When the reliability simulation step 104 is complete and the circuit design produced in step 102 meets a desired set of reliability criteria, a circuit design having low reliability as determined by the reliability simulation step 104 may be discarded and a new, modified circuit design can be produced and simulated.

The circuit design(s) produced in step 102 may be used to form a corresponding circuit on a wafer during wafer fabrication in step 106. Once the circuit design is verified in steps 102 and 104, and a corresponding circuit is formed on the wafer in step 106, the circuit on the wafer may be tested to verify proper electrical performance at the wafer level in step 108. In step 110, the wafer with the circuit thereon may be verified in step 110. Since circuit design reliability is determined before wafer fabrication in step 106, a number of defects (e.g., related to circuit reliability), in step 110 may be substantially reduced. This helps reduce manufacturing time and costs. The reliability simulation in step 104 will be described in more detail below with reference to FIGS. 2-25.

Figure 2:
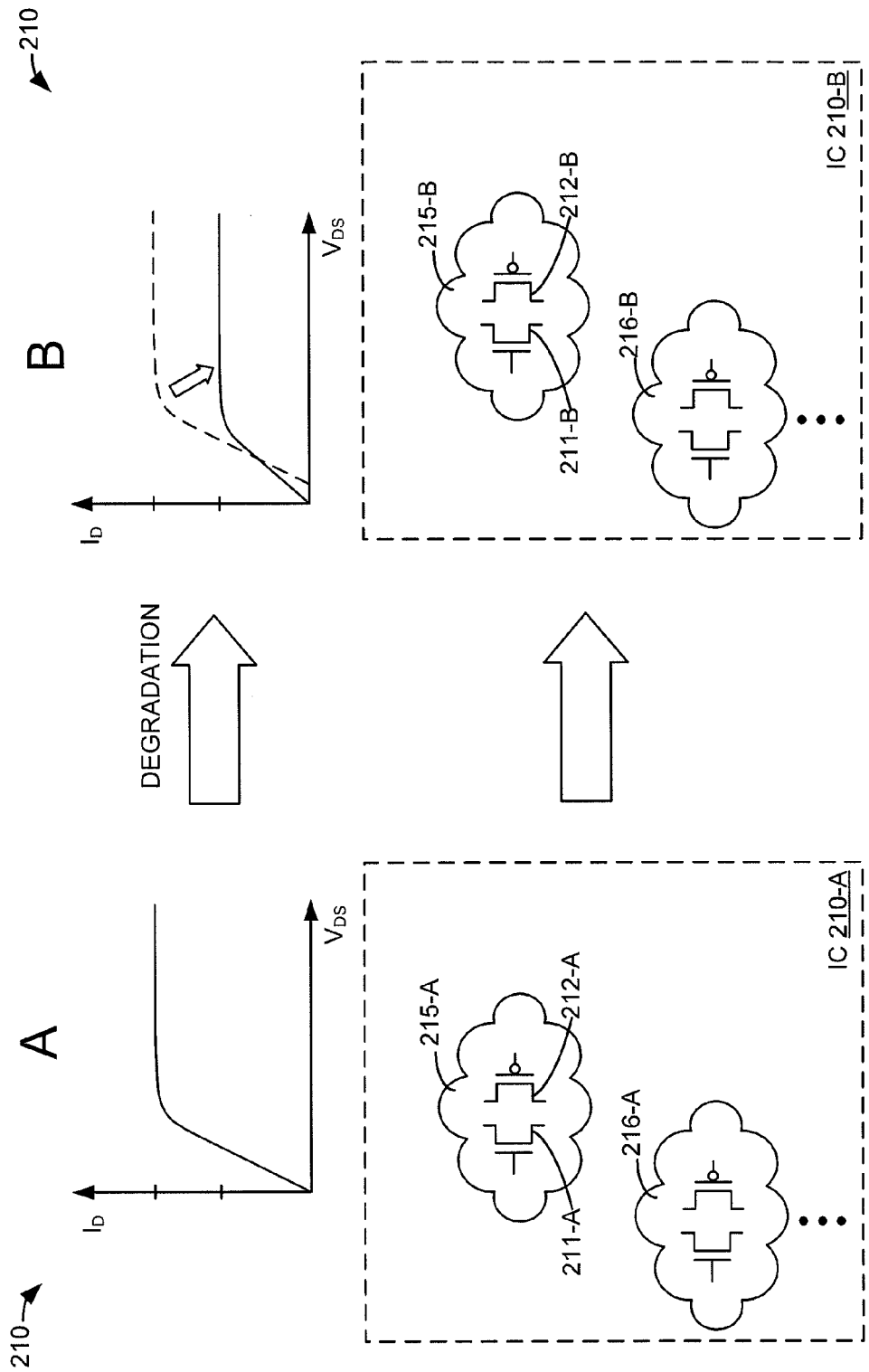
FIG. 2 is a diagram illustrating integrated circuit device degradation.

FIG. 2 is a diagram illustrating integrated circuit device degradation. In FIG. 2, integrated circuit 210 includes circuit 215 and circuit 216. Circuit 215 includes MOSFET 211 and MOSFET 212. Integrated circuit 210, is shown in FIG. 2 before and after degradation—denoted "A" and "B" respectively. Before degradation, integrated circuit 210 is shown as undegraded IC 210-A. After degradation, integrated circuit 210 is shown as degraded IC 210-B.

In FIG. 2, undegraded integrated circuit 210-A is shown including undegraded circuit 215-A and undegraded circuit 216-A. Undegraded circuit 215-A includes undegraded NFET 211-A and undegraded PFET 212-A. In other words, undegraded IC 210-A, undegraded circuit 215-A, undegraded circuit 216-A, undegraded NFET 211-A, and undegraded PFET 212-A illustrate the circuits and devices of IC 210 when they are in an undegraded condition (e.g., shortly after being manufactured.) The undegraded condition of the circuits and devices of IC 210-A are illustrated by the I-V curve illustrated above IC 210-A which illustrates an exemplary plot of MOS transistor characteristics of an undegraded device in IC 210-A.

Also in FIG. 2, degraded integrated circuit 210-B is shown including degraded circuit 215-B and degraded circuit 216-B. Degraded circuit 215-B includes degraded NFET 211-B and degraded PFET 212-B. In other words, degraded IC 210-B, degraded circuit 215-B, degraded circuit 216-B, degraded NFET 211-B, and degraded PFET 212-B illustrate the circuits and devices of IC 210 when they are in a degraded condition (e.g., after being operated for ten or more years.) The degraded condition of the circuits and devices of IC 210-A are illustrated by the I-V curve illustrated above IC 210-B which illustrates an exemplary plot of MOS transistor characteristics of an undegraded device in IC 210-B with the dashed line illustrating an I-V curve of a degraded device.

Figure 3:
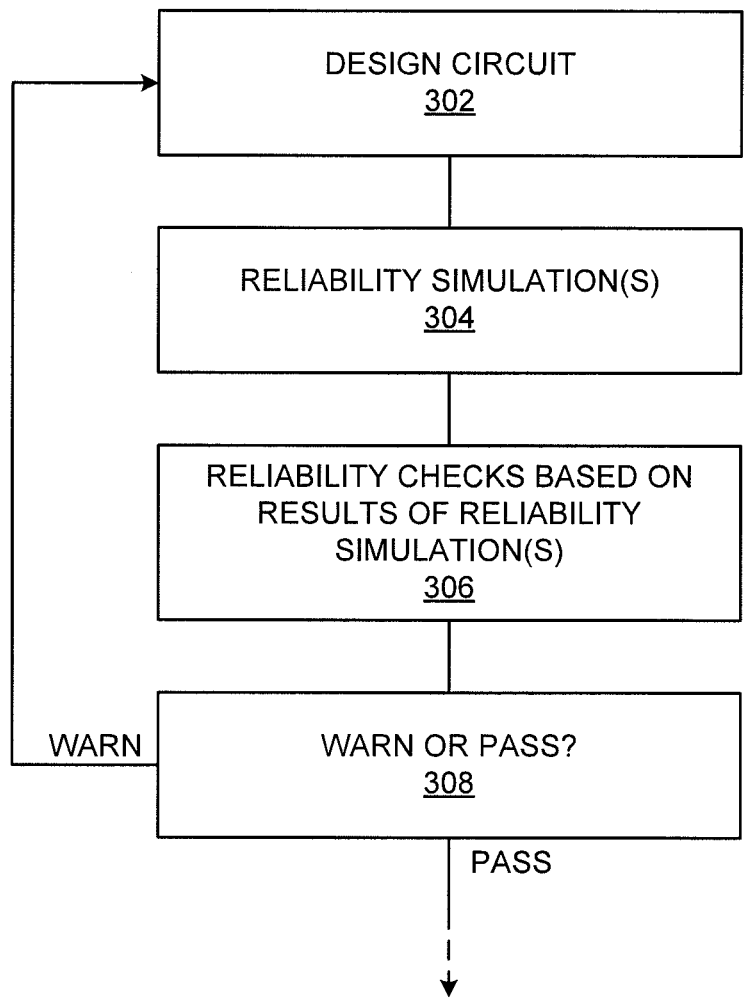
FIG. 3 is a flowchart illustrating a method of analyzing and improving the reliability of a circuit.

FIG. 3 is a flowchart illustrating a method of analyzing and improving the reliability of a circuit. A circuit is designed (302). This circuit includes at least one MOS transistor. The circuit may include a plurality of transistors of different types (e.g., NFET, PFET, etc.) In the plurality of transistors designed within the circuit, a type and a thickness of a gate insulation layer formed between a gate electrode and a respective channel may be selected for the MOS transistors in the circuit. As discussed previously with reference to FIG. 1, one or more reliability simulation of the circuit may be performed (304). This simulation may provide results and/or information that can be used in order to determine reliability, or degradation, of the MOS transistors used in the circuit. This simulation may be used to determine whether the circuit will function properly, or at a desired frequency/speed, with one or more MOS transistors in the circuit in a degraded condition.

Based on the results of the simulation (e.g., voltages and currents within the circuit and over time), reliability checks are performed (306). Based on the results of these reliability checks, the circuit may be passed, or a warning message (or error message) may be generated. If a warning message is generated, flow may proceed back to step 302 and the circuit re-designed or modified.

Figure 4:
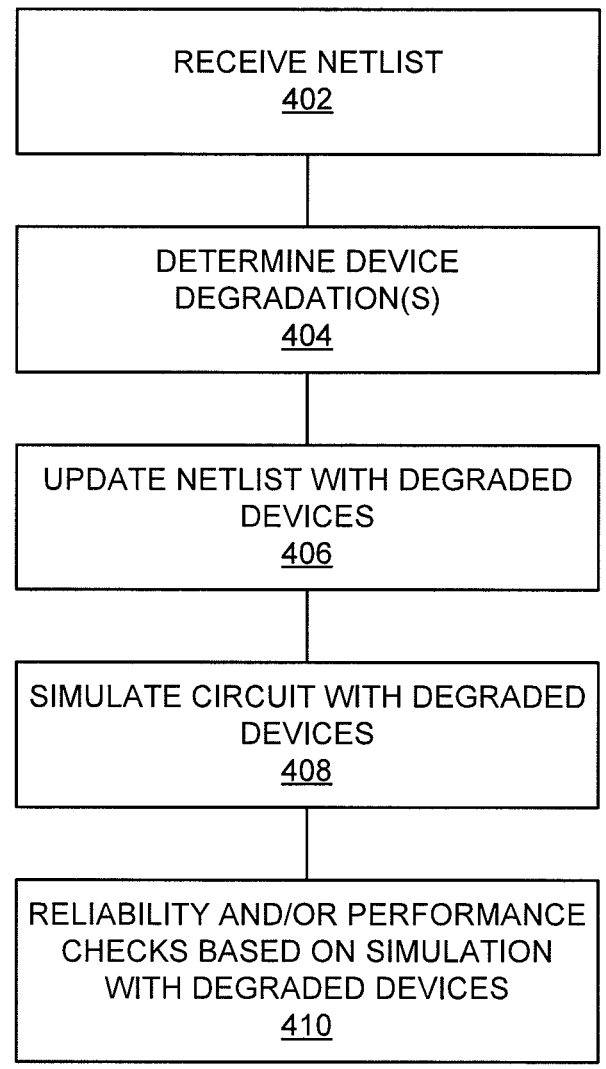
FIG. 4 is a flowchart illustrating a method of determining at least one effect of device degradation.

FIG. 4 is a flowchart illustrating a method of determining at least one effect of device degradation. The steps illustrated in FIG. 4 may be performed on, or for, one or more elements of IC 210. A netlist is received (402). For example, a netlist that describes undegraded circuit 215-A may be received. Device degradations are determined (404). For example, the changes to the characteristic parameters of NFET 211-A and/or PFET 212-A that degrades them into degraded NFET 211-B and PFET 212-B, respectively, may be calculated. These changes may be determined using information and/or results from a simulation of undegraded circuit 215-A.

The netlist is updated with degraded devices (406). For example, the netlist that describes the undegraded circuit 215-A may be updated with degraded devices NFET 211-B and PFET 212-B. The netlist may be updated by changing the characteristic parameters, such as saturation current and threshold voltage, of NFET 211-B and PFET 212-B to values that reflect the degraded state of NFET 211-B and PFET 212-B. It should be understood that the netlist of circuit 215 may be updated in other ways as well. For example, the netlist of circuit 215 may be updated by splitting one or more of NFET 211-B and/or PFET 212-B into multiple smaller transistors.

The circuit is simulated with the degraded devices (408). For example, circuit 215 may be simulated using the degraded characteristic parameters of NFET 211-B and PFET 212-B. Based on the simulation with degraded devices, reliability and/or performance checks are performed (410). For example, the results of the simulation performed in step 408 may provide one or more inputs to reliability equations, algorithms, or processes. These reliability equations, algorithms, and/or processes may generate a warning and/or error messages and/or modify the design. These reliability equations, algorithms, and or processes may determine one or more expected lifetimes of circuit 215, IC 210, and/or MOS transistors 211 and 212.

Figure 5:
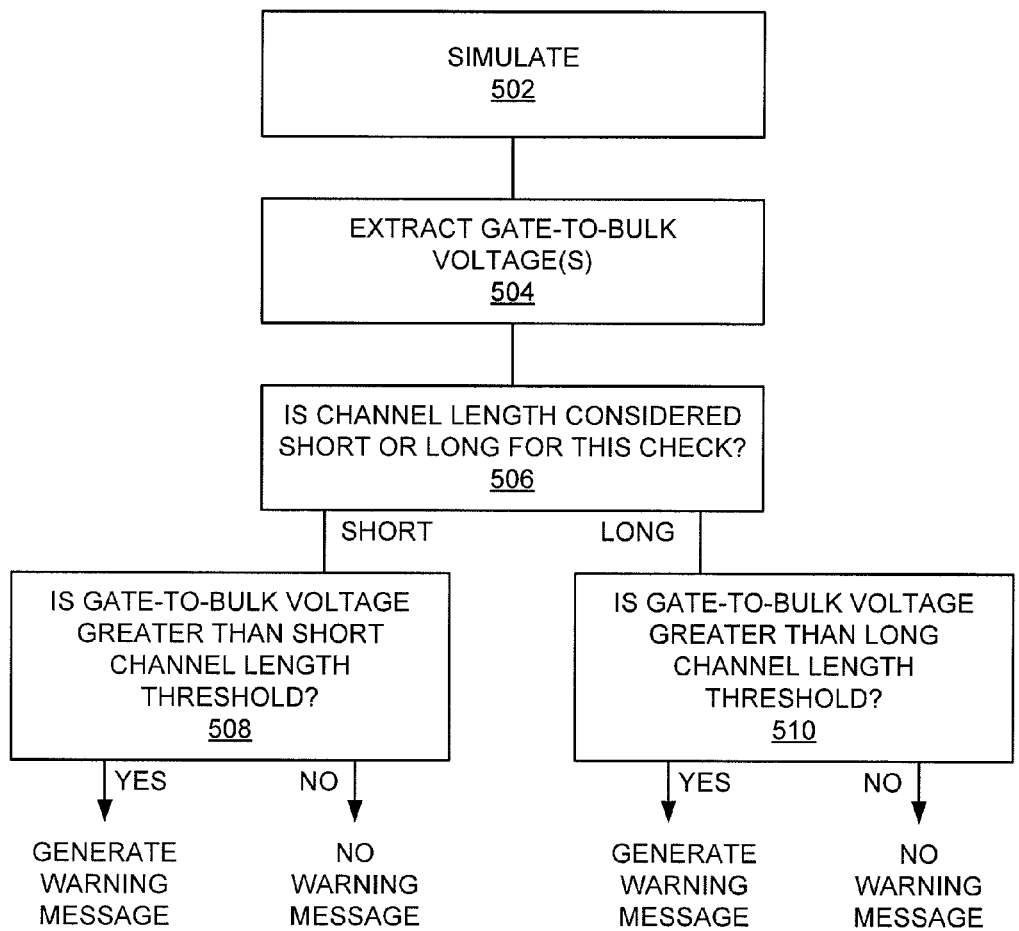
FIG. 5 is a flowchart illustrating a method for detecting reliability problems caused by back bias voltage.

FIG. 5 is a flowchart illustrating a method for detecting reliability problems caused by back bias voltage. The steps illustrated in FIG. 5 may be performed on, or for, one or more elements of IC 210. A circuit is simulated (502). For example, circuit 215 may be simulated in order to provide results and/or information that may be used for reliability checks and/or processes. Gate-to-bulk voltages are extracted (504). For example, the gate-to-bulk voltage(s) on NFET 211 during the simulation may be extracted from the results of the simulation performed in step 502. These gate-to-bulk voltages may vary over time.

A channel length is determined to be either short or long (506). For example, the channel length of NFET 211 may be consider short if it is less than a threshold value, and long if it is greater than a threshold value. If the channel length is considered to be short, flow proceeds to step 508. If the channel length is considered to belong, flow proceeds to step 510.

In step 508, the gate to bulk voltage is determined to be either greater than or less than a short channel length voltage threshold (508). If the gate to bulk voltage is determined to be greater than the short channel length voltage threshold, a warning message is generated. If the gate to bulk voltage is determined to be less than the short channel length voltage threshold, no warning message is generated.

For example, if NFET 211 has a channel length that is considered short for this reliability test, and the simulation results show that NFET 211 will be exposed to a gate to bulk voltage that exceeds the short channel length voltage threshold, a warning message can be generated. If NFET 211 has a channel length that is considered short for this reliability test, and the simulation results show that NFET 211 will not be exposed to a gate to bulk voltage that exceeds the short channel length voltage threshold, a warning message should not be generated.

In step 510, the gate to bulk voltage is determined to be either greater than or less than a long channel length full touch threshold (510). If the gate to bulk voltage is determined to be greater than the long channel length voltage threshold, a warning message is generated. If the gate to bulk voltage is determined to be less than the long channel length voltage threshold, no warning messages generated.

For example, if NFET 211 has a channel length that is considered long for this reliability test, and the simulation results show that NFET 211 will be exposed to a gate to bulk voltage that exceeds the long channel length voltage threshold, a warning message can be generated. If NFET 211 has a channel length that is considered long for this reliability test, and the simulation results show that NFET 211 will not be exposed to a gate to bulk voltage that exceeds the long channel length voltage threshold, a warning message should not be generated.

In an embodiment, this check is performed for every MOS transistor instance in the netlist. The long channel length voltage threshold is typically less than the short channel length voltage threshold. It should also be understood, that the short channel length voltage threshold, and the long channel length voltage threshold are magnitudes. In other words, for a PMOS transistor, the gate to bulk voltage and the channel length voltage thresholds could be expressed as negative numbers.

In an embodiment, the short channel length voltage threshold, the long channel length voltage threshold, and the threshold that divides short channel devices from long channel devices may be selected using the equation and pseudo-code given in Table 1. In Table 1, the constants $A_1$-$A_8$ are fabrication processed dependent and are determined by reliability measurements on test devices and/or circuits.

TABLE 1

If($V_{gs} - V_{bs} > A_1$) {
  Lifetime = $A_2$ * exp($A_3/(V_{gs} - V_{bs}) + A_4/T + A_5/\min(A_6,L)$) +
  ($V_{bs} + V_{ds} < -A_6$ ? 0 : $A_7$) *
    ln(max($A_8, V_{gs} - V_{ds}$));
}

Where:
$V_{gs}$ is the gate-to-source voltage;
$V_{bs}$ is the gate-to-bulk voltage;
$V_{ds}$ is the drain-to-source voltage;
T is temperature; and,
L is the length of the device's gate.

Figure 6:
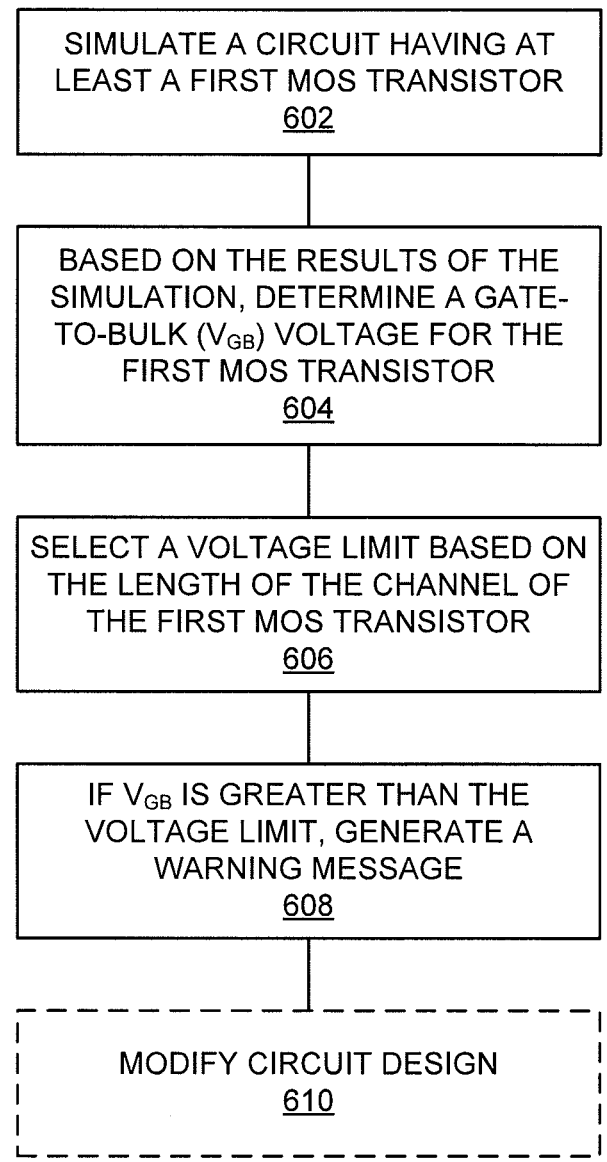
FIG. 6 is a flowchart illustrating a method for checking for back bias voltage reliability problems.

FIG. 6 is a flowchart illustrating a method for checking for back bias voltage reliability problems. The steps illustrated in FIG. 6 may be performed on, or for, one or more elements of IC 210. A circuit having at least a first MOS transistor is simulated (602). For example, circuit 215 may be simulated to obtain results that may be used in reliability checks. Based on the results of the simulation, a gate to bulk voltage for the first MOS transistor is determined (604). For example, based on the results the simulation one or more gate to bulk voltages that n-channel MOS transistor 211 is exposed to may be determined.

A voltage limit based on the length of the channel of the first MOS transistor is selected (606). For example, based on the length of MOS transistor 211, a voltage limit threshold for MOS transistor 211 may be selected. There may be multiple voltage limit thresholds from which the voltage limit threshold for MOS transistor 211 is selected. For example, rather than having only two voltage limit thresholds, one for short channel lengths and one for long channel lengths, multiple ranges of channel lengths (e.g., short, medium short, medium, etc.) may be used to select the voltage limit threshold. In another embodiment, a continuous function may be used to select the voltage limit threshold. In other words, the voltage limit threshold may be determined by a continuous function of channel length. In an embodiment, the voltage limit threshold may be determined by a continuous function of channel length and/or other parameters such as temperature.

If the gate to bulk voltage is greater than the voltage limit, a warning message is generated (608). For example, if the simulation results show that the gate to bulk voltage on MOS transistor 211 exceeds the selected threshold, then a warning message can be generated. Optionally, the circuit design may be modified (610). For example, if a warning message is generated, the design of circuit 215 may be modified so that the gate to bulk voltage on MOS transistor 211 does not exceed the selected threshold. In an embodiment, a warning message can be generated if the lifetime as calculated according to Table 1 is less than a threshold lifetime. If the lifetime as calculated according to Table 1 is less than a threshold lifetime the circuit design may be modified.

In an embodiment, the voltage limit threshold may be further selected based on a temperature associated with the MOS transistor and/or circuit. An expected lifetime of the first MOS transistor may be calculated. For example, an expected lifetime of the first MOS transistor may be calculated using the equation in Table 1. The expected lifetime of the MOS transistor may be calculated based on gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage that are obtained from the simulation results.

Figure 7:
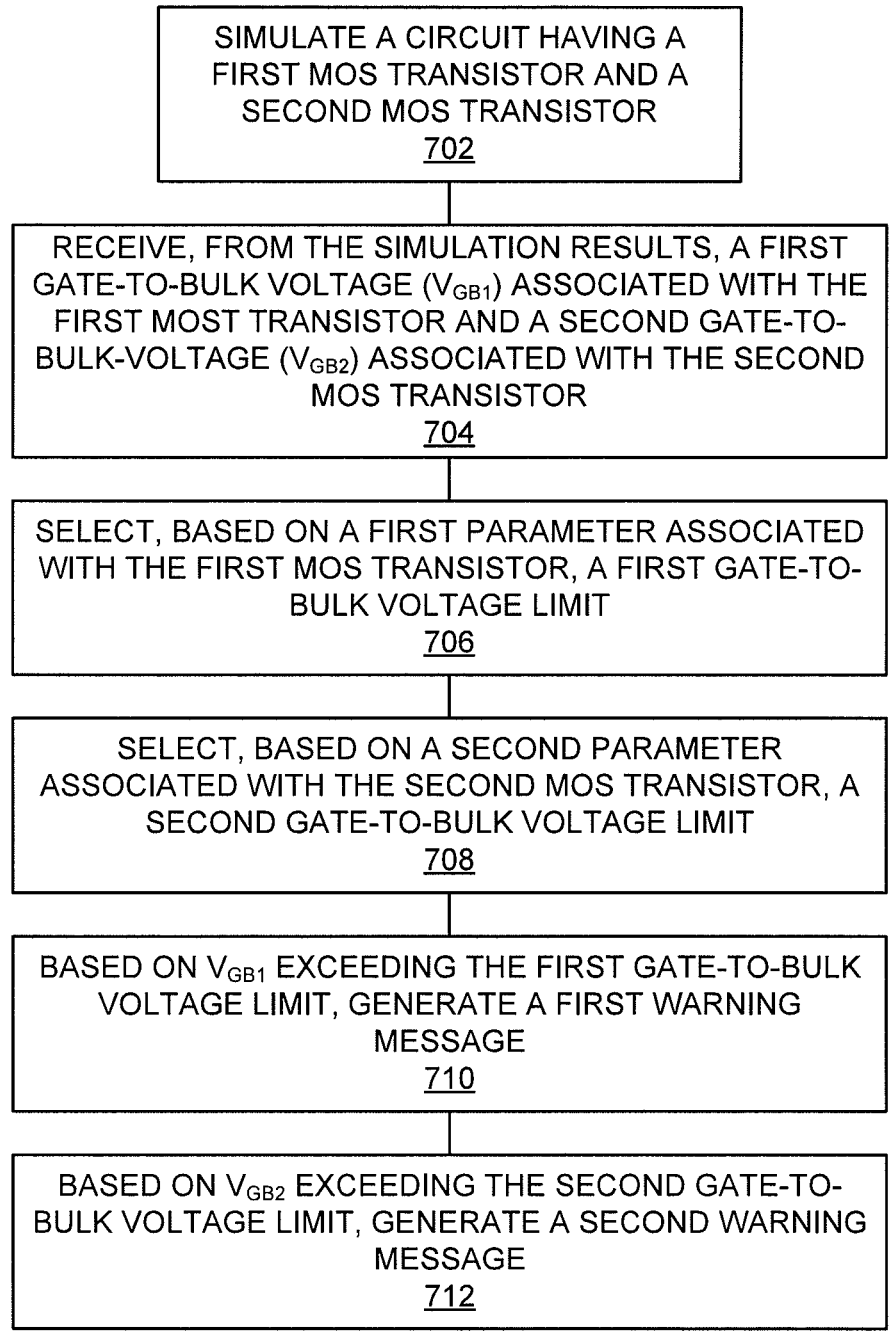
FIG. 7 is a flowchart illustrating a method for checking for reliability problems caused by back bias voltage on an MOS transistor.

FIG. 7 is a flowchart illustrating a method for checking for reliability problems caused by back bias voltage on an MOS transistor. The steps illustrated in FIG. 7 may be performed on, or for, one or more elements of IC 210. A circuit having a first MOS transistor and a second MOS transistor is simulated (702). The first and second MOS transistors may have different (i.e., first and second) channel lengths. For example, circuit 215 may be simulated in order to determine simulation results that may be used to analyze the reliability of circuit 215 and/or MOS transistor 211 and MOS transistor 212. MOS transistor 211 and MOS transistor 212 may have different channel lengths.

From the simulation results, a first gate to bulk voltage ($V_{gb1}$) associated with the first MOS transistor and a second gate to bulk voltage ($V_{gb2}$) associated with the second MOS transistor are received (704). For example, the simulation results may provide one or more gate to bulk voltages associated with MOS transistor 211 and one or more gate to bulk voltages associated with MOS transistor 212.

Based on a first parameter associated with the first MOS transistor, a first gate to bulk voltage limit is selected (706). For example, based on a first parameter associated with MOS transistor 211, a gate to bulk voltage limit for MOS transistor 211 may be selected. The first parameter may be the gate length of MOS transistor 211. The first gate-to-bulk voltage limit may be selected based on the channel length of the first MOS transistor being considered short for the purposes of this reliability check.

Based on a second parameter associated with the second MOS transistor, a second gate to bulk voltage limit is selected (708). For example, based on a second parameter associated with MOS transistor 212, a gate to bulk voltage limit for MOS transistor 212 may be selected. The second parameter may be the gate length of MOS transistor 212. The second gate-to-bulk voltage limit may be selected based on the channel length of the second MOS transistor being considered long for the purposes of this reliability check.

Based on the gate to bulk voltage associated with the first MOS transistor ($V_{gb1}$) exceeding the first gate to bulk voltage limit, a first warning message is generated (710). For example, based on the simulation results showing that the first MOS transistor will be exposed to gate to bulk voltages that exceed the first gate to bulk voltage limit, a warning message is generated. In an embodiment, a warning message can be generated if the lifetime of the first MOS transistor as calculated according to Table 1 is less than a threshold lifetime. If the lifetime of the first MOS transistor as calculated according to Table 1 is less than a threshold lifetime the circuit design may be modified.

Based on the gate to bulk voltage associated with the second MOS transistor ($V_{gb2}$) exceeding the second gate to bulk voltage limit, a second warning message is generated (712). For example, based on the simulation results showing that the second MOS transistor will be exposed to gate to bulk voltages that exceed the second to gate to bulk voltage limit, a warning message is generated. In an embodiment, the second gate to bulk voltage limit is less than the first gate to bulk voltage limit. In an embodiment, a warning message can be generated if the lifetime of the second MOS transistor as calculated according to Table 1 is less than a threshold lifetime. If the lifetime of the second MOS transistor as calculated according to Table 1 is less than a threshold lifetime the circuit design may be modified.

In an embodiment, the first parameter associated with the first MOS transistor is based on the first channel length of the first MOS transistor and the second parameter associated with the second MOS transistor is based on the second channel length of the second MOS transistor. In an embodiment, the first parameter associated with the first MOS transistor is based on a first temperature associated with the first MOS transistor and the second parameter associated with the second MOS transistor is based on a second temperature associated with the second MOS transistor. The first parameter associated with the first MOS transistor and the second parameter associated with the second MOS transistor are based on a single temperature associated with both the first MOS transistor and the second MOS transistor.

Figure 8:
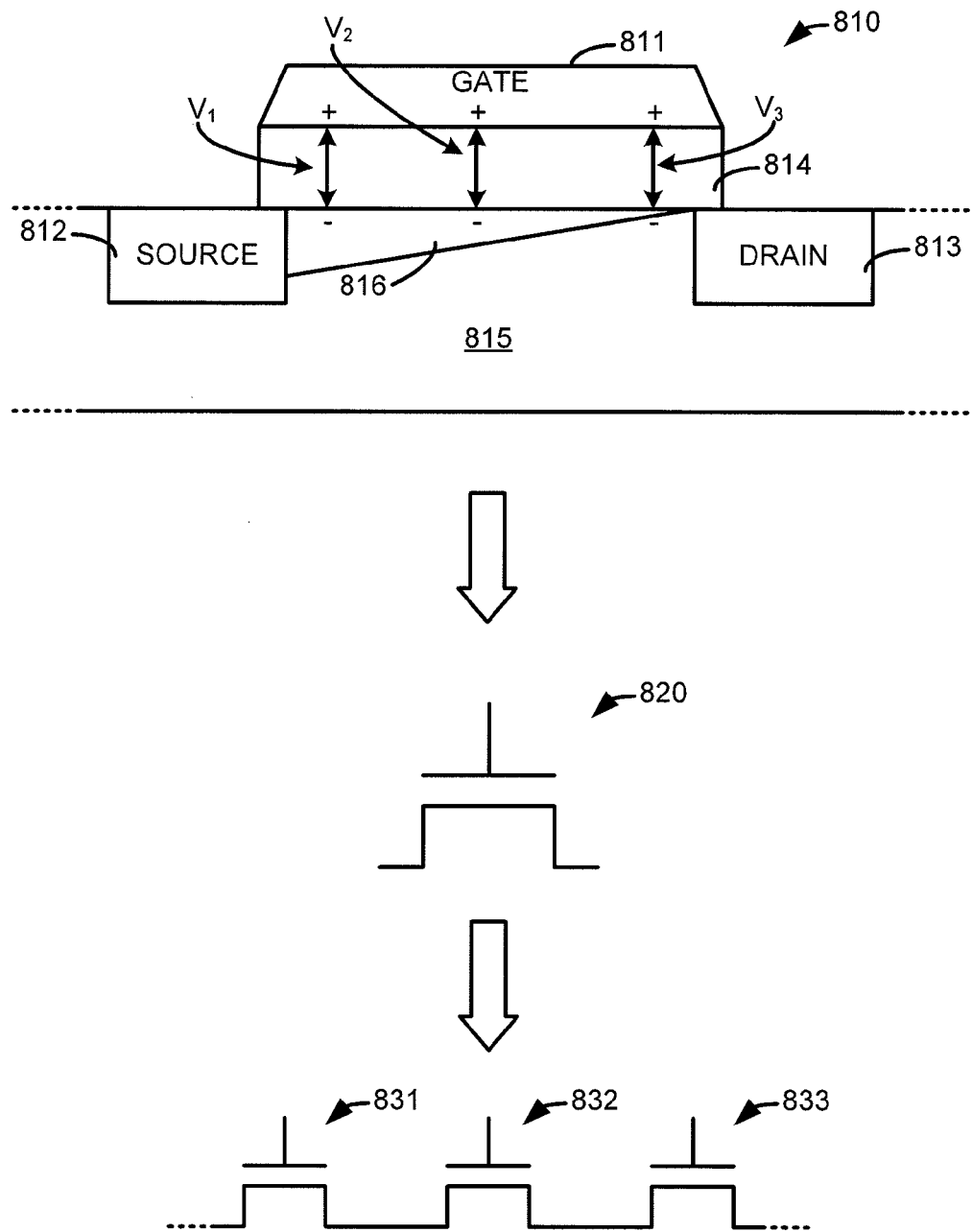
FIG. 8 is a diagram of illustrating a method of modeling an MOS transistor to detect reliability problems.

FIG. 8 is a diagram of illustrating a method of modeling an MOS transistor to detect reliability problems. FIG. 8 includes an illustration of MOS transistor 810. MOS transistor 810 can be an element of IC 210, such as MOS transistor 211 or MOS transistor 212. MOS transistor 810 includes gate 811, source 812, drain 813, gate dielectric 814, bulk 815, and inversion layer 816. Also shown in FIG. 8 are gate voltages (i.e., voltages that gate dielectric 814 is exposed to) at three locations along the channel of MOS transistor 810. These voltages are labeled $V_1$, $V_2$, and $V_3$ (from left to right, source 812 to drain 813, respectively.) It should be noted that in typical operation, the voltages $V_1$, $V_2$, and $V_3$ are not always equal. Typically, when MOS transistor is biased in the saturation region of operation, the magnitude of $V_1$ is greater than $V_2$, and the magnitude of $V_2$ is greater than the magnitude of $V_3$. In other words, $|V_1|>|V_2|>|V_3|$.

When modeled for reliability simulations, discussed herein, MOS transistor 810 may be modeled as a single MOS transistor represented in FIG. 8 by MOS transistor symbol 820. In an embodiment, however, MOS transistor 810 may be modeled by a plurality of MOS transistors 831-833, in series, each with a channel length less than that of MOS transistor 810 (or 820). Thus, for example, at least some of effects of gate voltage $V_1$ on MOS transistor 810 may be determined from the simulation results that give the gate voltage on MOS transistor 831. At least some of effects of gate voltage $V_2$ on MOS transistor 810 may be determined from the simulation results that give the gate voltage on MOS transistor 832. At least some of effects of gate voltage $V_3$ on MOS transistor 810 may be determined from the simulation results that give the gate voltage on MOS transistor 833.

Figure 9:
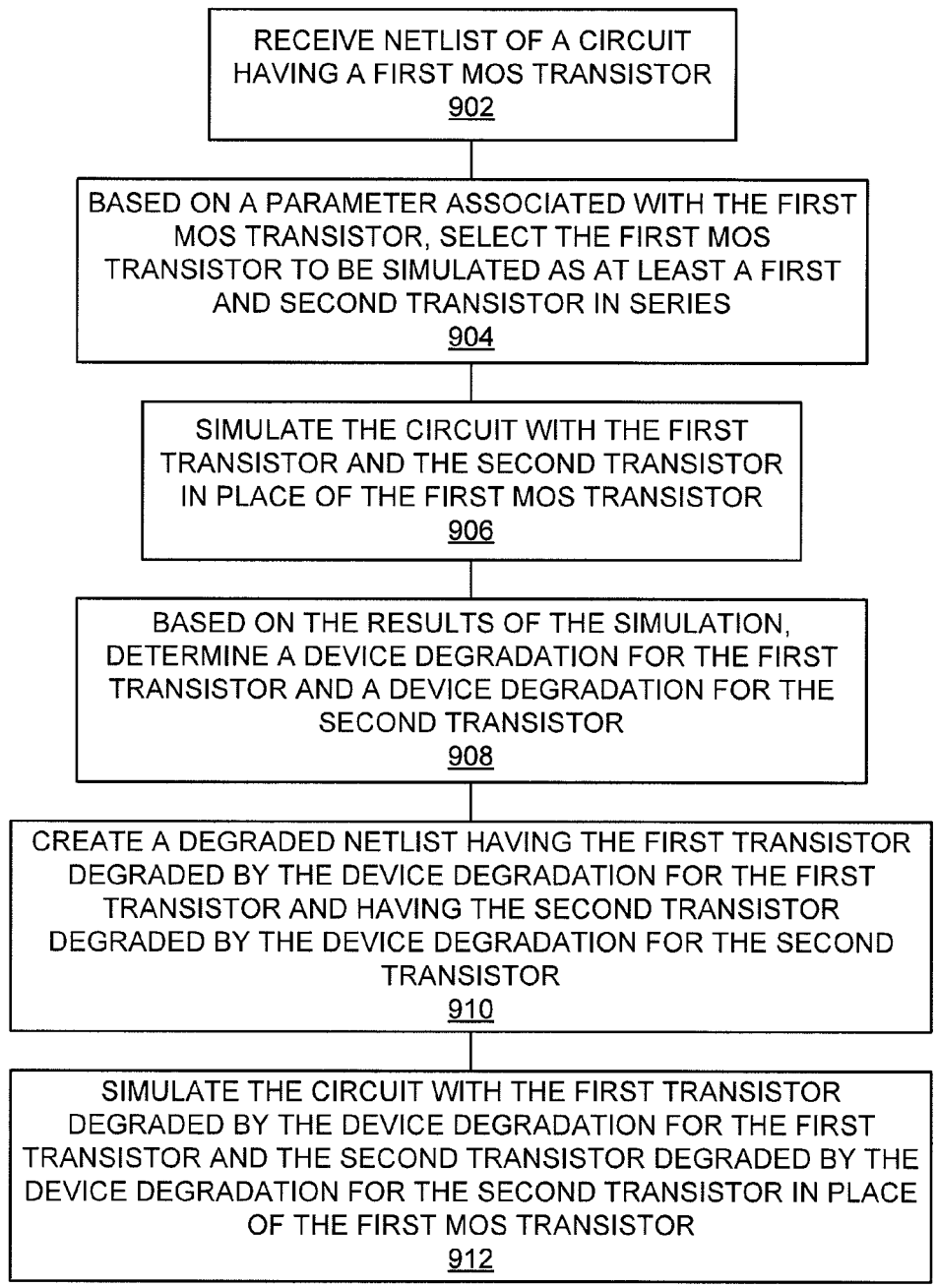
FIG. 9 is a flowchart illustrating a method of checking for reliability problems by modeling long gate length transistors with multiple smaller transistors.

FIG. 9 is a flowchart illustrating a method of checking for reliability problems by modeling long gate length transistors with multiple smaller transistors. The steps illustrated in FIG. 9 may be performed on, or for, one or more elements of IC 210, including MOS transistor 810. A netlist of a circuit having a first MOS transistor is received (920). For example, a netlist of circuit 215 or integrated circuit 210 can be received. Based on a parameter associated with the first MOS transistor, the first MOS transistor is selected to be simulated as at least a first MOS transistor and a second MOS transistor in series (904). For example, based on the channel length of MOS transistor 810, MOS transistor 810 may be selected to be modeled and/or simulated as MOS transistors 831-833. MOS transistor 810 may be selected to be modeled as multiple smaller MOS transistors when the channel length of MOS transistor 810 exceeds a selected length threshold.

The circuit is simulated with the first transistor and the second transistor in place of the first MOS transistor (906). For example, circuit 215 may be simulated with at least a first and second transistor, in series, in place of MOS transistor 211. The first and second transistor may be modeled as having equal channel lengths. In another example, a circuit with MOS transistor 810 may be simulated with at least MOS transistors 831-833 in place of MOS transistor 810. The circuit may be simulated with the lengths of MOS transistors 831-833 being equal.

Based on the results of the simulation, a device degradation for the first transistor and a device degradation for the second transistor are determined (908). For example, based on the results of a reliability simulation, device degradation may be determined for each of MOS transistors 831-833. Each of these device degradations for MOS transistors 831-833 may be different. Each of the determined device degradations for MOS transistors 831-833 may be different because $V_1$, $V_2$, and $V_3$ have different values during all or part of the simulation(s).

A degraded netlist having the first transistor degraded by the device degradation for the first transistor and the second transistor degraded by the device degradation for the second transistor is created (910). For example, a second netlist of circuit 215 or integrated circuit 210 can be created that has MOS transistors 831-833 (or a subset thereof) degraded by the device degradations determined from the simulation results obtained in step 906. The degraded netlist may be created by changing the characteristic parameters, such as saturation current and threshold voltage, of MOS transistors 831-833 (or a subset thereof) to values that reflect the degraded state of one or more MOS transistors 831-833. It should be understood that the degraded netlist of having degraded versions of one or more of MOS transistors 831-833 may be created in other ways as well.

The circuit is simulated with the first transistor degraded by the device degradation for the first transistor and the second transistor degraded by the device degradation for the second transistor in place of the first MOS transistor (912). For example, circuit 215 or integrated circuit 210 may be simulated with the degraded versions of MOS transistors 831-833 in place of MOS transistor 810. These results of this simulation may be used to calculate an expected lifetime for one or more of the individual MOS transistors 831-833. An expected lifetime of the circuit may be calculated using one or more of the calculated values of the expected lifetimes of the individual MOS transistor 831-833.

Figure 10:
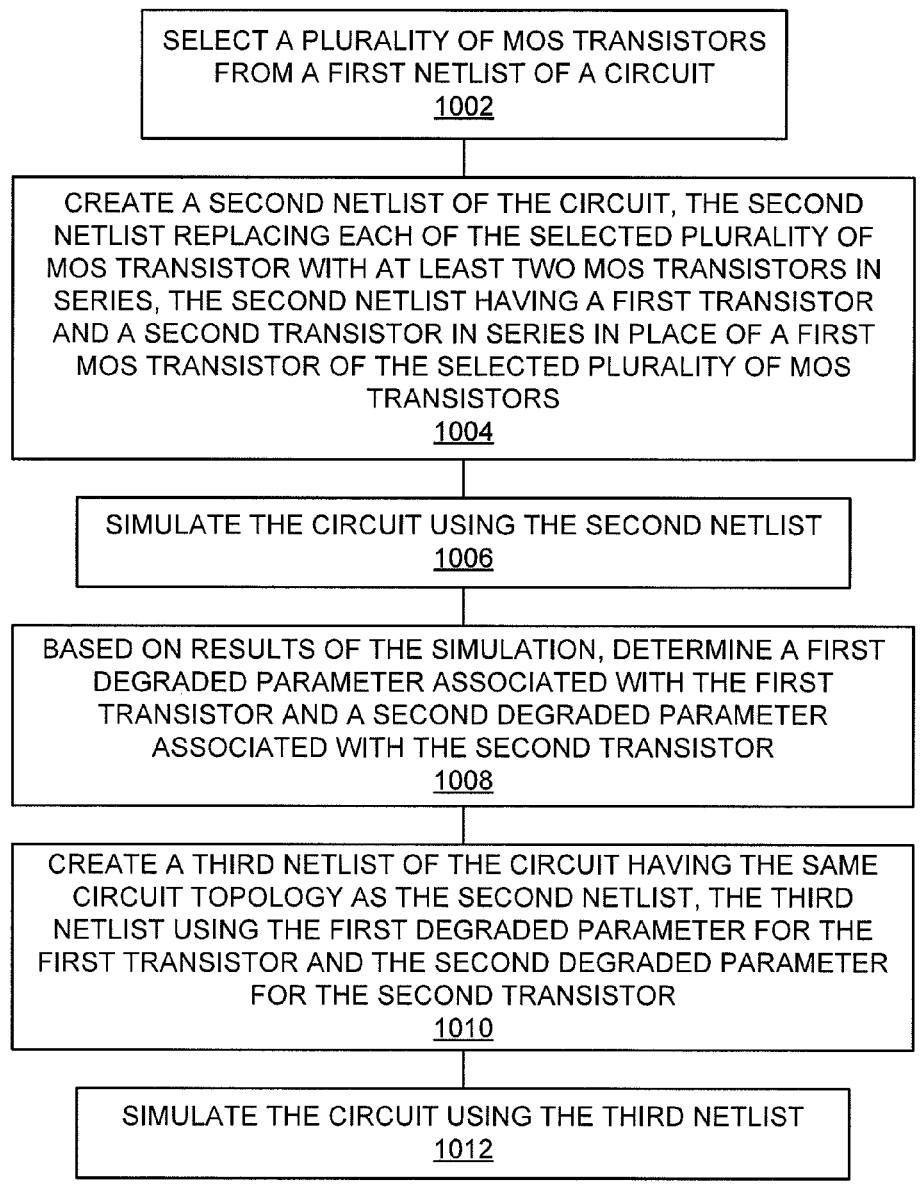
FIG. 10 is a flowchart illustrating a method of checking for reliability problems by simulating transistors with multiple smaller transistors.

FIG. 10 is a flowchart illustrating a method of checking for reliability problems by simulating transistors with multiple smaller transistors. The steps illustrated in FIG. 910 may be performed on, or for, one or more elements of IC 210, including MOS transistor 810. A plurality of MOS transistors are selected from a first netlist of a circuit (1002). For example, MOS transistors 211 and 212 may be selected from a netlist of circuit 215 and/or IC 210. Likewise, MOS transistor 810 may be selected from a netlist of circuit 215 and/or IC 210.

MOS transistors 211 and 212 may be selected based on one or more parameters associated with each of MOS transistor 211 and MOS transistor 212, respectively. These one or more parameters associated may include the channel lengths of MOS transistor 211 and/or MOS transistor 212. These one or more parameters may include other parameters or variables associated with MOS transistor 211 and/or MOS transistor 212 such as a tag that is associated with one or more of MOS transistor 211 and/or MOS transistor 212.

MOS transistors 211 and 212 may be selected based on parameters that may include a sensitivity of a circuit output associated with each of MOS transistor 211 and/or MOS transistor 212. The sensitivity of a circuit output associated with each of MOS transistor 211 and/or MOS transistor 212 may be based on a sensitivity of the circuit output to the degradation of parameters or the degradation of the characteristic parameters of MOS transistor 211 and/or MOS transistor 212. In other words, for example, if a circuit output is particularly sensitive to saturation current degradation in MOS transistor 211, but not to degradation of the saturation current of MOS transistor 212, then the sensitivity associated with MOS transistor 211 may be used as the basis for selecting MOS transistor 211.

A second netlist of the circuit is created. In the second netlist, each of the selected plurality of MOS transistors is replaced with at least two MOS transistors in series. This includes having a first and second transistor in series in place of a first MOS transistor of the selected plurality of MOS transistors (1004). For example, a second netlist corresponding to circuit 215 may be created that has MOS transistors 831 and 832 (and/or 833), in series, in place of a MOS transistor 810.

The circuit is simulated using the second netlist (1006). For example, circuit 215 may be simulated using a netlist that has MOS transistors 831 and 832 (and/or 833), in series, in place of a MOS transistor 810. Based on the results of the simulation, a first degraded parameter associated with the first transistor and a second degraded parameter associated with the second transistor are determined. For example, based on the results of the simulation, degraded values for the threshold voltages ($V_{th}$) and/or saturation current ($I_{dsat}$) may be determined for MOS transistor 830 and MOS transistor 831 (and/or MOS transistor 833). The first degraded parameter associated with the first transistor and the second degraded parameter associated with the second transistor may be different. For example, each of the degraded parameters associated with MOS transistors 831-833 may be different because $V_1$, $V_2$, and $V_3$ had different values during all or part of the simulation(s).

A third netlist of the circuit is created. This third netlist has the same circuit topology as the second netlist. The third netlist uses the first degraded parameters for the first transistor and the second degraded parameters for the second transistor (1010). For example, a third netlist corresponding to circuit 215 may be created that has MOS transistors 831 and 832 (and/or 833), in series, in place of a MOS transistor 810 and uses degraded parameters for MOS transistors 831 and 832 (and/or 833). These degraded parameters may be degraded values for the threshold voltages ($V_{th}$) and/or saturation current ($I_{dsat}$) and/or carrier mobility of MOS transistor 830 and MOS transistor 831 (and/or MOS transistor 833).

The circuit is simulated using the third netlist (1012). This simulation may be used to determine whether the circuit will function properly, or at a desired frequency/speed, with one or more MOS transistors in the circuit in a degraded condition. This simulation may be used to determine an expected lifetime of the circuit and/or integrated circuit.

Figure 11:
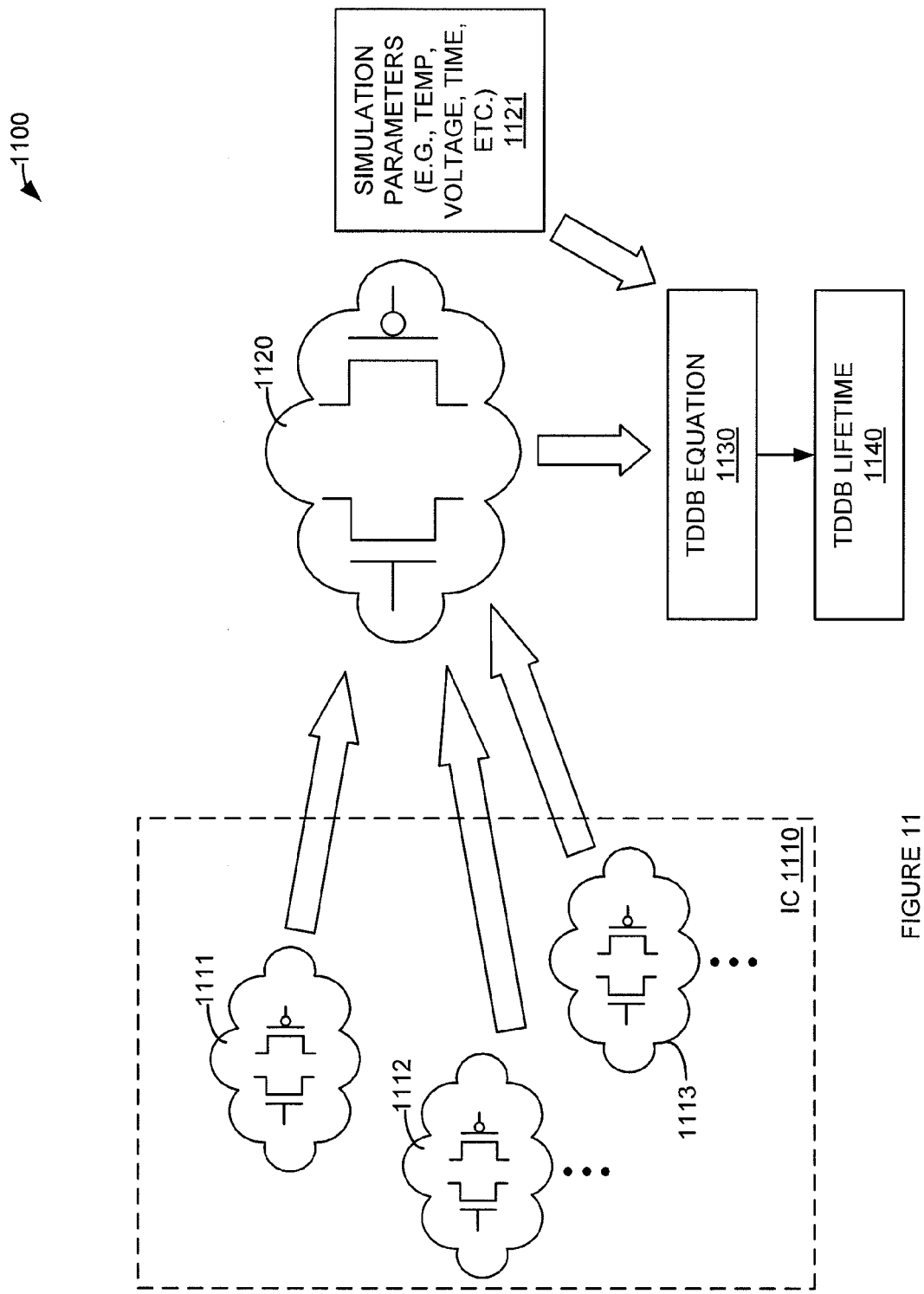
FIG. 11 is a diagram illustrating using the entire dielectric area of chip in time dependent dielectric breakdown checking.

FIG. 11 is a diagram illustrating using the entire dielectric area of chip in time dependent dielectric breakdown checking. FIG. 11 includes an illustration of integrated circuit 1110. Integrated circuit 1110 may be, or have the design and/or circuits as integrated circuit 210. Integrated circuit 1110 is shown including circuit 1111, circuit 1112, and circuit 1113. Integrated circuit 1110 may include additional circuits. In an embodiment, all, or substantially all of the gate area of all of the circuits 1110-1113 in integrated circuit 1110 are summed together to produce a total gate area for the entire (or substantially entire) integrated circuit 1110. This is illustrated in FIG. 11 by circuit 1120.

The total gate area of integrated circuit 1110 is input to the time dependent dielectric breakdown (TDDB) equation 1130. Simulation parameters 1121 such as temperature, voltage, time, etc. are also input to time dependent dielectric breakdown equation 1130. Time dependent dielectric breakdown equation 1130 is used to produce an expected time dependent dielectric breakdown lifetime 1140.

Figure 12:
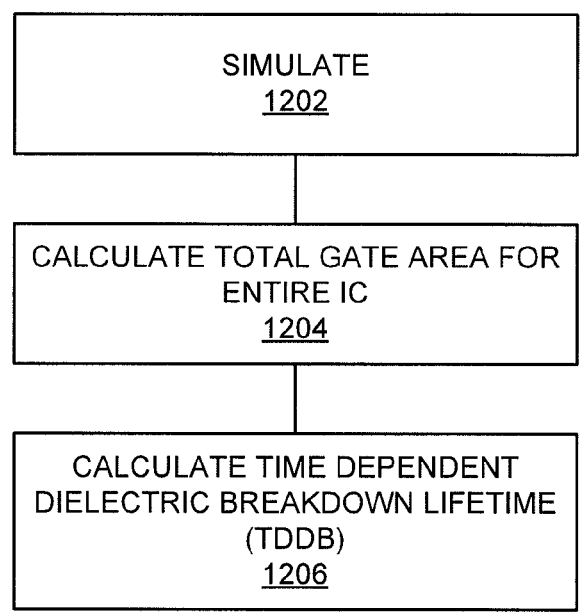
FIG. 12 is a flowchart illustrating a method of checking for reliability problems related to time dependent dielectric breakdown.

FIG. 12 is a flowchart illustrating a method of checking for reliability problems related to time dependent dielectric breakdown. The steps illustrated in FIG. 12 may be performed on, or for, one or more elements of IC 210, or IC 1110. A circuit or integrated circuit design is simulated (1202). For example, a simulation of circuit 215, IC 210, or IC1110, or one of their elements may be simulated in order to provide input parameters for a time dependent dielectric breakdown analysis (equation).

The total gate area for an entire (or substantially entire) integrated circuit is calculated (1204). For example, the gate area for all of the MOS transistors in the design of IC 210 or IC 1110 may be determined. An example of a substantially entire gate area is the sum of areas that result in the output of the time dependent dielectric breakdown analysis yielding results that are within 0% to 10% of the exact result.

A time dependent dielectric breakdown lifetime is calculated (1206). For example, an expected lifetime, based on TDDB, for IC 210 or IC 1110 may be determined using a TDDB equation and the results obtained in steps 1202 and 1204. The TDDB lifetime may also be based on a simulated operating temperature of the integrated circuit. For example, the TDDB lifetime obtained in step 1206 may be based on an operating temperature used in the simulation in step 1202. The TDDB lifetime may be further based on a simulated value for a gate voltage associated with the individual transistors used in the TDDB calculation. For example, the TDDB lifetime obtained in step 1206 may be based on a gate voltage obtained from a transistor in the simulation in step 1202.

The TDDB lifetime may be further combined with results from other reliability checks and/or calculations. For example, an expected lifetime of an MOS transistor in IC 210 may be determined based on gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage that are obtained from the simulation results. This expected lifetime may be used in combination with the TDDB lifetime obtained in step 1206 to determine an expected lifetime of the integrated circuit 210. If the expected lifetime of the integrated circuit, either due to TDDB or the expected lifetime of the MOS transistor, or both, is less than a predetermined lifetime, the design of integrated circuit 210 may be modified.

FIG. 13 is a flowchart illustrating a method of determining an expected lifetime of an integrated circuit. The steps illustrated in FIG. 13 may be performed on, or for, one or more elements of IC 210, or IC 1110. A first total MOS transistor gate area having a first gate dielectric thickness is determined (1302). This total may be for the entire (or substantially entire) area in an integrated circuit having a gate dielectric of this first thickness. For example, the total gate area for all of the MOS transistors having a first gate dielectric thickness in the design of IC 210 or IC 1110 may be determined.

Optionally, a second total MOS transistor gate area having a second gate dielectric thickness is determined (1306). This total may be for the entire (or substantially entire) area in an integrated circuit having a gate dielectric of this second thickness. For example, the total gate area for all of the MOS transistors having a second gate dielectric thickness in the design of IC 210 or IC 1110 may be determined.

Based on the first total MOS transistor gate area having a first gate dielectric thickness, a gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage, an expected lifetime of a first MOS transistor is determined (1310). For example, an expected lifetime of the first MOS transistor in IC 210 or IC 1110 may be calculated according the equation and pseudo-code given in Table 1.

Based on the expected lifetime of the first MOS transistor, and (if applicable) the expected lifetime of a second MOS transistor having the second gate dielectric thickness, an expected lifetime of the integrated circuit is determined. For example, based on the lifetime calculated in step 1310, and a total gate area having a second dielectric thickness, an expected lifetime for IC 210 or IC 1110 may be calculated. If the expected lifetime for IC 210 or IC 1110 is less than a predetermined lifetime, the design of IC 210 or IC 1110, respectively, may be modified.

Figure 14:
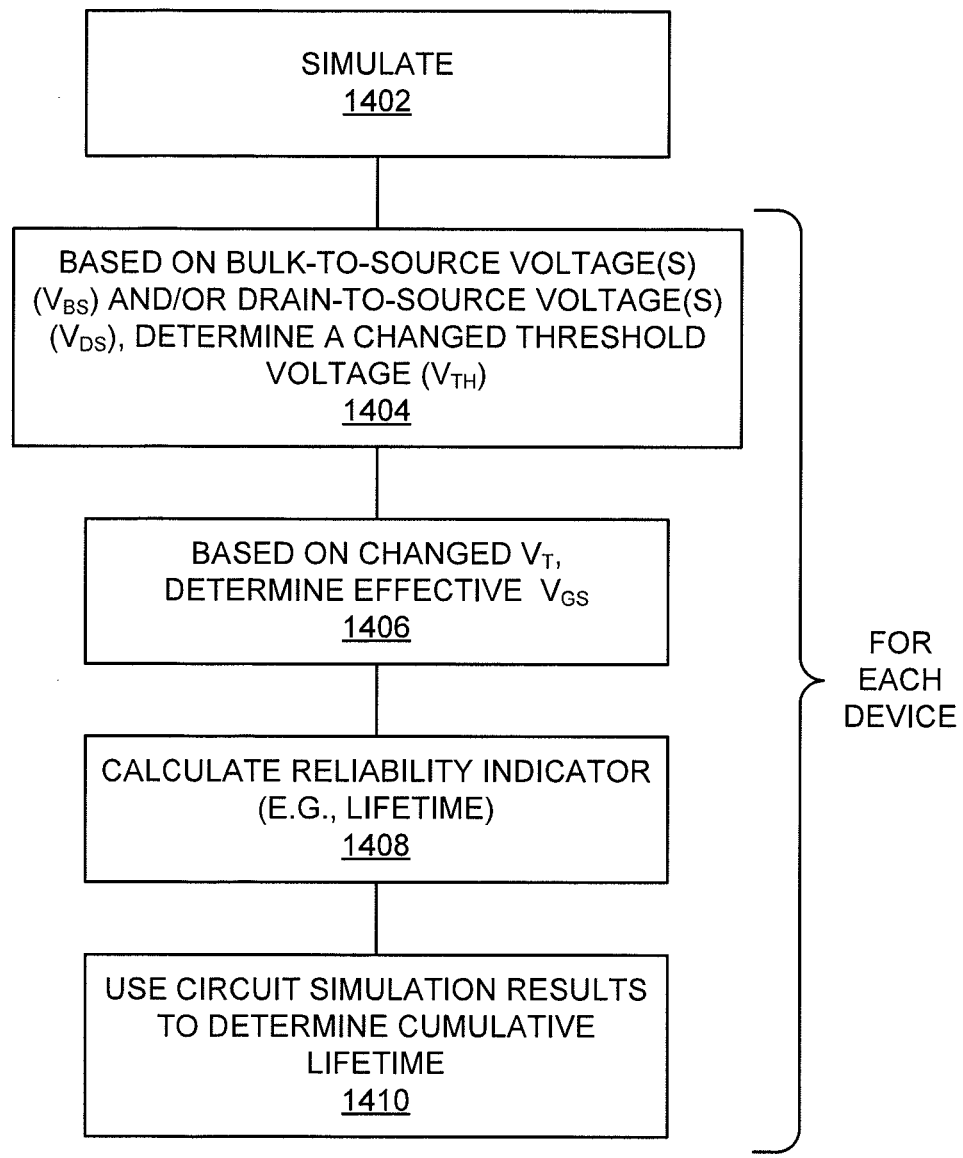
FIG. 14 is a flowchart illustrating a method of determining an expected lifetime based on threshold voltage changes caused by back bias voltage.

FIG. 14 is a flowchart illustrating a method of determining an expected lifetime based on threshold voltage changes caused by back bias voltage. The steps illustrated in FIG. 14 may be performed on, or for, one or more elements of IC 210. A circuit is simulated (1402). For example, circuit 215 may be simulated in order to provide results and/or information that may be used for reliability checks and/or processes. Steps 1404, 1406, and 1408 may be performed for each device in the circuit. Based on bulk-to-source ($V_{bs}$) and/or drain-to-source ($V_{ds}$) voltage(s) and/or $V_{gs}$, a changed threshold voltage ($V_{th}$) is determined (1404). For example, based on $V_{bs}$ and/or $V_{ds}$ and/or $V_{gs}$ results obtained from the simulation in step 1402, a changed $V_{th}$ for MOS transistor 211 may be calculated. Based on the changed threshold voltage, an effective gate-to-source ($V_{gs}$) voltage may be determined (1406). For example, based on the $V_{th}$ obtained in step 1404, an effective $V_{gs}$ for use in reliability checks or equations may be calculated For example, a reliability equation/calculation for the expected lifetime before failure of an MOS transistor due to hot carrier injection (HCI) effects that is based on bulk-to-source voltage ($V_{bs}$), drain-to-source ($V_{ds}$) voltage, and gate-to-source voltage $V_{gs}$ is given. In Table 1, the constants $B_1$-$B_{15}$ are fabrication processed dependent and are determined by reliability measurements on test devices and/or circuits.

TABLE 2

Lifetime = $B_1$*exp($B_2$/max($V_{ds}$,$B_3$)−$B_4$/T−$B_5$/($B_6$*L)−$B_7$*
ln(min($B_8$,max($B_9$,$V_{gs}$− $B_{10}$*sqrt(max($B_{11}$,$B_{12}$−$V_{bs}$))))/
max($B_{13}$,$V_{ds}$)))+($V_{bs}$<0?−$B_{14}$*$V_{bs}$*$V_{bs}$−$B_{15}$*$V_{bs}$:0.0)

Where:
$V_{gs}$ is the gate-to-source voltage;
$V_{bs}$ is the gate-to-bulk voltage;
$V_{ds}$ is the drain-to-source voltage;
T is temperature; and,
L is the length of the device's gate.

The circuit simulation results are used to determine a cumulative lifetime (1410). For example, the circuit simulation results may be used to calculate an overall lifetime of MOS transistor 211 and/or circuit 215. Voltage waveforms from a transient analysis circuit simulation can be used to calculate and report a cumulative lifetime.

Thus, it should be understood that while hot carrier injection degradation (and therefore circuit expected lifetime) depends on $V_{ds}$ to a first order, other voltage dependencies, such as $V_{gs}$ and $V_{bs}$ may be substantial. At high $V_{gs}$ voltages, $V_{bs}$ can have a negative effect on the reliability lifetime due to HCI effects. However, at low $V_{gs}$, $V_{bs}$ can reduce the negative effects of HCI on the expected lifetime. Thus, by using a term that is based on the increase of threshold voltage ($V_{th}$) with $V_{bs}$ (and possibly $V_{ds}$), and using, e.g., $V_{gs}-V_{th}$ in the overall equation, the accuracy of the equations/calculations that determine the effects (e.g., expected lifetime) of HCI are improved.

Figure 15:
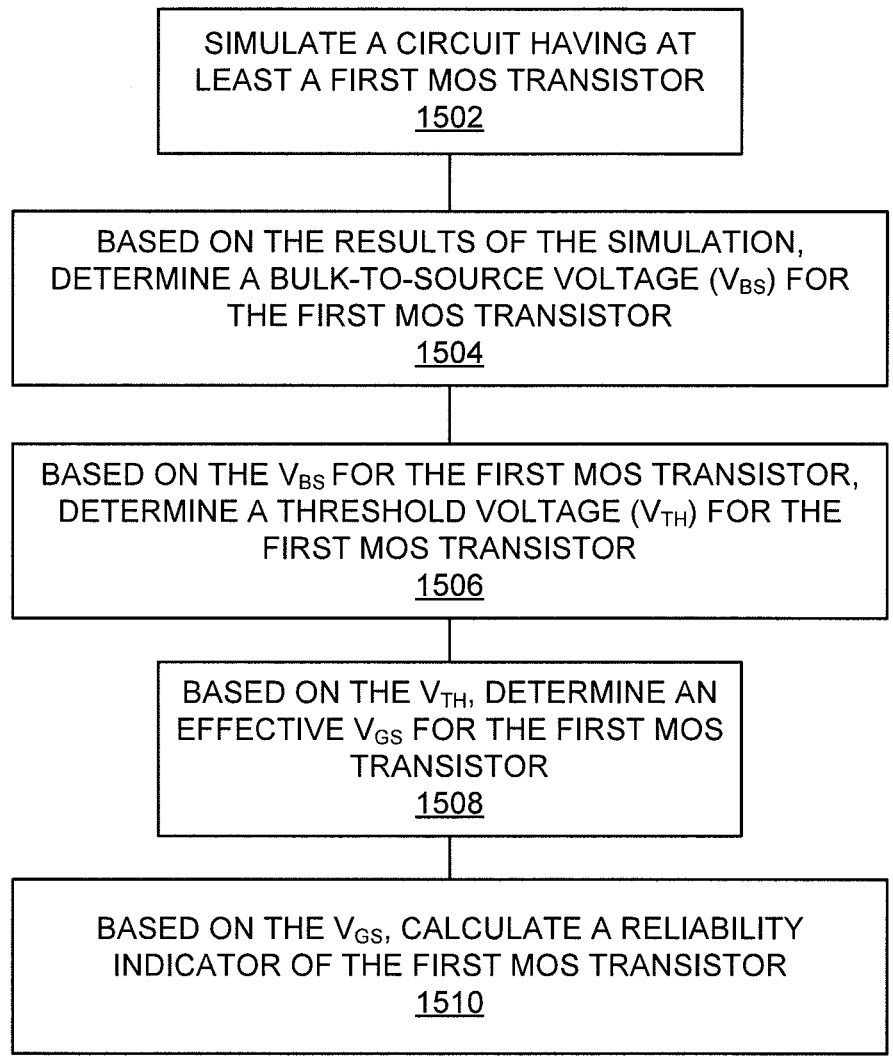
FIG. 15 is a flowchart illustrating a method of calculating an indicator of reliability associated with threshold voltage changes caused by back bias voltage.

FIG. 15 is a flowchart illustrating a method of calculating an indicator of reliability associated with threshold voltage changes caused by back bias voltage. The steps illustrated in FIG. 15 may be performed on, or for, one or more elements of IC 210. A circuit that has at least a first MOS transistor is simulated (1502). For example, circuit 215 may be simulated in order to provide results and/or information that may be used for reliability checks and/or processes. Based on the results of the simulation, a bulk-to-source voltage ($V_{bs}$) for the first MOS transistor is determined (1504). For example, the simulation results may be used to determine a $V_{bs}$ voltage for MOS transistor 211. This $V_{bs}$ may be based on the operating point of MOS transistor. The $V_{bs}$ may be based on integrating a voltage (e.g., $V_{bs}$) over a transient analysis of circuit 215.

Based on the $V_{bs}$ for the first MOS transistor, a threshold voltage ($V_{th}$) for the first MOS transistor is determined (1506). For example, a changed or degraded threshold voltage for MOS transistor 211 may be calculated based on the $V_{bs}$ calculated in step 1504. Based on the threshold voltage ($V_{th}$), determine an effective gate-to-source voltage ($V_{gs}$) for the first MOS transistor (1508). For example, based on the $V_{th}$ obtained for MOS transistor 211, an effective $V_{gs}$ for use in reliability checks of MOS transistor 211 and/or circuit 215 may be calculated. Based on the effective gate-to-source voltage ($V_{gs}$), a reliability indicator of the first MOS transistor is calculated (1510). For example, based on the effective $V_{gs}$ obtained in step 1508, the degradation of saturation current ($I_{dsat}$) expected over a period of time for MOS transistor 211 and/or its effects on circuit 215 may be calculated.

In some embodiments, the threshold voltage ($V_{th}$) obtained in step 1506 may be further based on a drain-to-source voltage ($V_{ds}$). For example, the threshold voltage calculated for MOS transistor 211 may be based on both $V_{bs}$ and $V_{ds}$ obtained from the simulation in step 1502.

In an embodiment, an expected lifetime of the first MOS transistor may be calculated based on gate-to-bulk voltage(s) ($V_{gb}$), a temperature parameter (T), the length of the channel of the MOS transistor (L), a determined effective gate-to-source voltage ($V_{gs}$), and, a drain-to-source ($V_{ds}$) voltage that are obtained from the simulation results in step 1502. For example, an expected lifetime of the first MOS transistor may be calculated using the equation in Table 1 and the simulation results associated with circuit 215, and MOS transistor 211, in particular. The expected lifetime of the first MOS transistor may be combined with the expected lifetime of a second MOS transistor and the reliability indicator of the first MOS transistor to determine an expected lifetime of an integrated circuit. For example, the expected lifetime of the first MOS transistor calculated using the equation in Table 1 may be combined with the expected lifetime of a second transistor calculated using any of the techniques described herein and the reliability indicator determined in step 1510 to determine an expected lifetime of integrated circuit 210.

Figure 16:
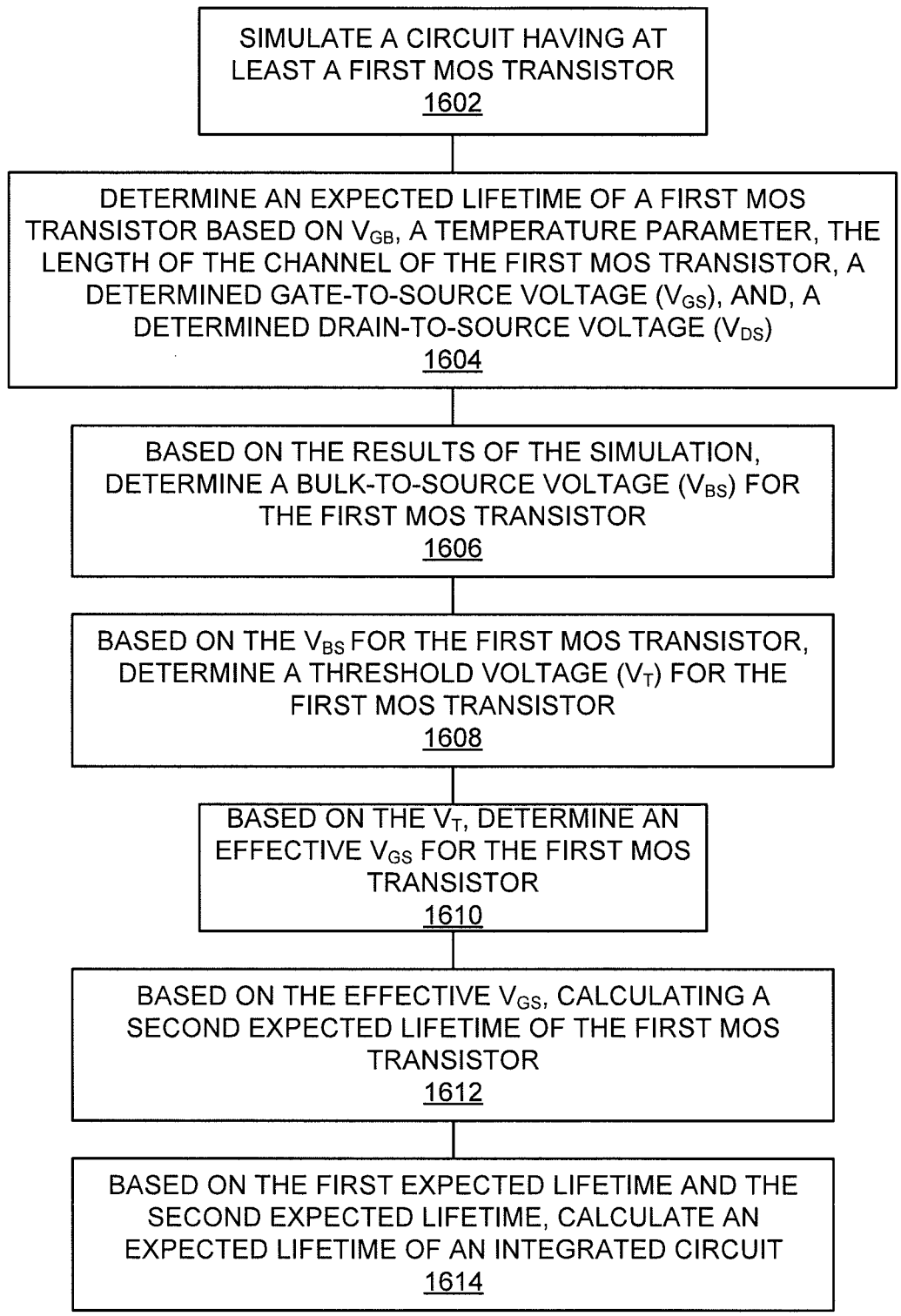
FIG. 16 is a flowchart illustrating a method of determining an expected lifetime of an integrated circuit.

FIG. 16 is a flowchart illustrating a method of determining an expected lifetime of an integrated circuit. The steps illustrated in FIG. 16 may be performed on, or for, one or more elements of IC 210. A circuit having at least a first MOS transistor is simulated (1602). For example, circuit 215 may be simulated in order to provide results and/or information that may be used for reliability checks and/or processes. An expected lifetime of a first MOS transistor that is based on gate-to-bulk voltage ($V_{gb}$), a temperature parameter, the length of the channel of the first MOS transistor, a determined effective gate-to-source voltage ($V_{gs}$), and a drain-to-source voltage is determined (1604). For example, an expected lifetime of the first MOS transistor may be calculated using the equation in Table 1 and the simulation results associated with circuit 215, and MOS transistor 211, in particular.

Based on the results of the simulation, a bulk-to-source voltage ($V_{bs}$) for the first MOS transistor is determined (1606). For example, the simulation results may be used to determine a $V_{bs}$ voltage for MOS transistor 211. This $V_{bs}$ may be based on the operating point of MOS transistor. The $V_{bs}$ may be based on integrating a voltage (e.g., $V_{bs}$) over a transient analysis of circuit 215.

Based on the $V_{bs}$ for the first MOS transistor, a threshold voltage ($V_{th}$) for the first MOS transistor is determined (1608). For example, a changed or degraded threshold voltage for MOS transistor 211 may be calculated based on the $V_{bs}$ calculated in step 1504. Based on the threshold voltage ($V_{th}$), determine an effective gate-to-source voltage ($V_{gs}$) for the first MOS transistor (1610). For example, based on the $V_{th}$ obtained for MOS transistor 211, an effective $V_{gs}$ for use in reliability checks of MOS transistor 211 and/or circuit 215 may be calculated.

Based on the effective $V_{gs}$, a second expected lifetime of the first MOS transistor is calculated (1612). For example, a second expected lifetime of the first MOS transistor may be calculated using the equation given in Table 2. Based on the first expected lifetime and the second expected lifetime, calculate and expected lifetime of an integrated circuit (1614). For example, based on the expected lifetime of MOS transistor 211 calculated in step 1604, and the expected lifetime of MOS transistor 211 calculated in step 1612, and expected lifetime for integrated circuit 210 may be determined. If the expected lifetime of the integrated circuit is less than a predetermined lifetime, the design of the integrated circuit may be modified. The second expected lifetime may be based on a reliability indicator of the first MOS transistor. For example, the second expected lifetime may be based on the degradation of saturation current ($I_{dsat}$) expected over a period of time for MOS transistor 211 and/or its effects on circuit 215.

Figure 17:
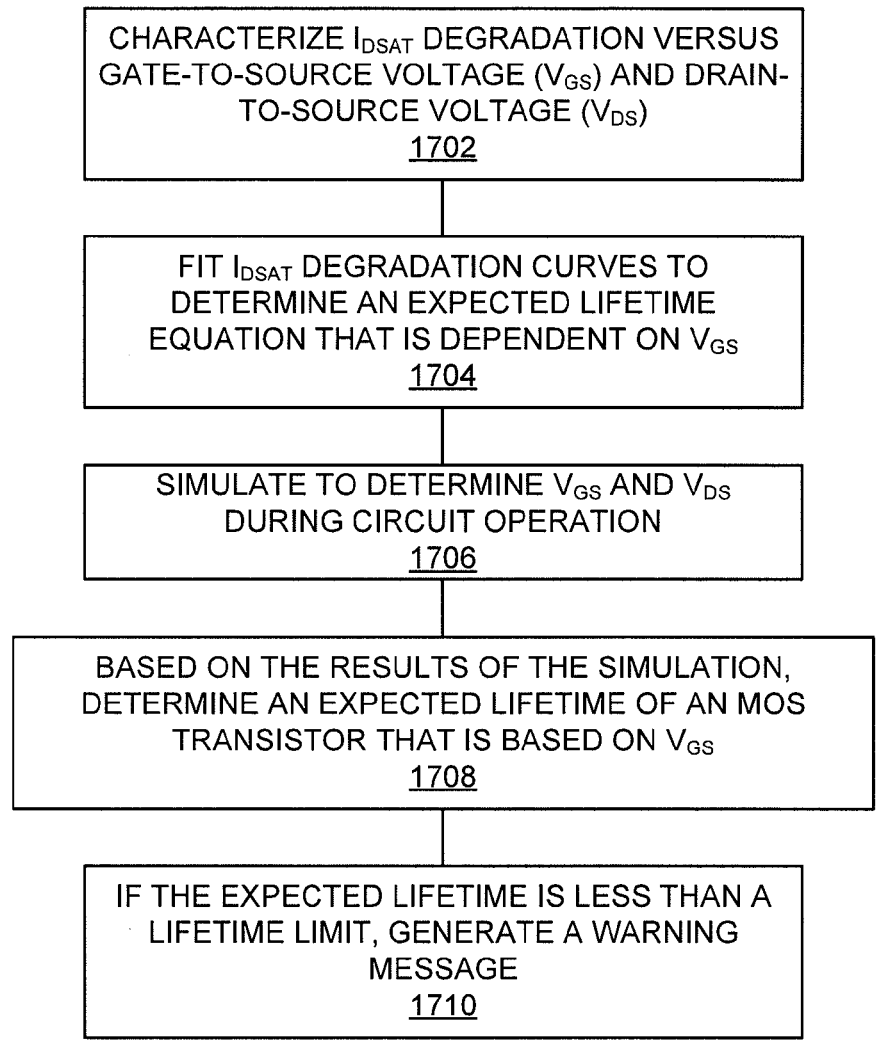
FIG. 17 is a flowchart illustrating a method of checking for saturation current degradation reliability problems.

FIG. 17 is a flowchart illustrating a method of determining an expected lifetime of an integrated circuit. The steps illustrated in FIG. 17 may be performed on, or for, one or more elements of IC 210. Saturation current ($I_{dsat}$) degradation versus gate-to-source voltage ($V_{gs}$) and drain-to-source voltage ($V_{ds}$) is characterized (1702). For example, for the integrated circuit fabrication process that is to produce IC 210, the degradation of the MOS transistor characteristic parameter $I_{dsat}$ when MOS transistors fabricated in this process are exposed to various gate-to-source voltages, drain-to-source voltages, and/or ratios of $V_{gs}/V_{ds}$, for various lengths of time and at various temperatures, is measured. These measurements may be plotted to form saturation current degradation curves.

The saturation current degradation curves are fit to determine an expected lifetime equation that is dependent on $V_{gs}$ (1704). For example, the measured saturation current data points versus $V_{gs}$ and/or $V_{ds}$ may be fit to a linear, power-law, or exponential curve. In another example, the measured saturation current data points versus $V_{gs}$ divided by $V_{ds}$ may be fit to a linear, power-law, or exponential curve. In another embodiment, the amount of time until the measured saturation current data points degrades by a predetermined amount versus $V_{gs}$, $V_{ds}$ and/or $V_{gs}$ divided by $V_{ds}$, may be fit to a linear, power-law, or exponential curve. These fit curves may be used to produce equations that relate, for example, $V_{gs}$, $V_{ds}$, and/or $V_{gs}$ divided by $V_{ds}$, to $I_{dsat}$, $I_{dsat}$ degradation, and/or the expected lifetime of an MOS transistor.

A circuit is simulated (1706). For example, circuit 215 may be simulated in order to provide results and/or information that may be used for reliability checks and/or processes. These reliability checks and/or processes may provide input(s) to the curves/equations developed in step 1704. Based on the results of the simulation, an expected lifetime of an MOS transistor that is based on $V_{gs}$ is determined (1708). For example, based on the results of a simulation of circuit 215, an expected lifetime for MOS transistor 211 may be determined from one or more curves and/or equations developed in step 1704. If the expected lifetime is less than a lifetime limit, a warning message is generated (1710). For example, if the expected lifetime of MOS transistor 211 is less than a predetermined lifetime (e.g., 10 years), a warning message can be generated. In response to the warning message, or in response to the expected lifetime of MOS transistor 211 being less than a predetermined lifetime, the design of circuit 215 may be modified.

The curves developed in step 1704 may be fit for more than one region of $V_{gs}$, $V_{ds}$, and/or $V_{gs}$ divided by $V_{ds}$. For example, a second expected lifetime equation may be developed. The first expected lifetime equation may be used for a first range of $V_{gs}$ values while the second expected lifetime equation is used for a second range of $V_{gs}$ values. In other words, the first expected lifetime equation may be used for $V_{gs} < V_{EQ1}$, and the second expected lifetime equation is used for $V_{gs} > V_{EQ1}$, where $V_{EQ1}$ is a predetermined value. The expected lifetime(s) may also be adjusted to account for bias temperature instability (BTI) such that the degradation from BTI is not double counted in the lifetime equation (s) and/or the expected lifetime(s).

Figure 18:
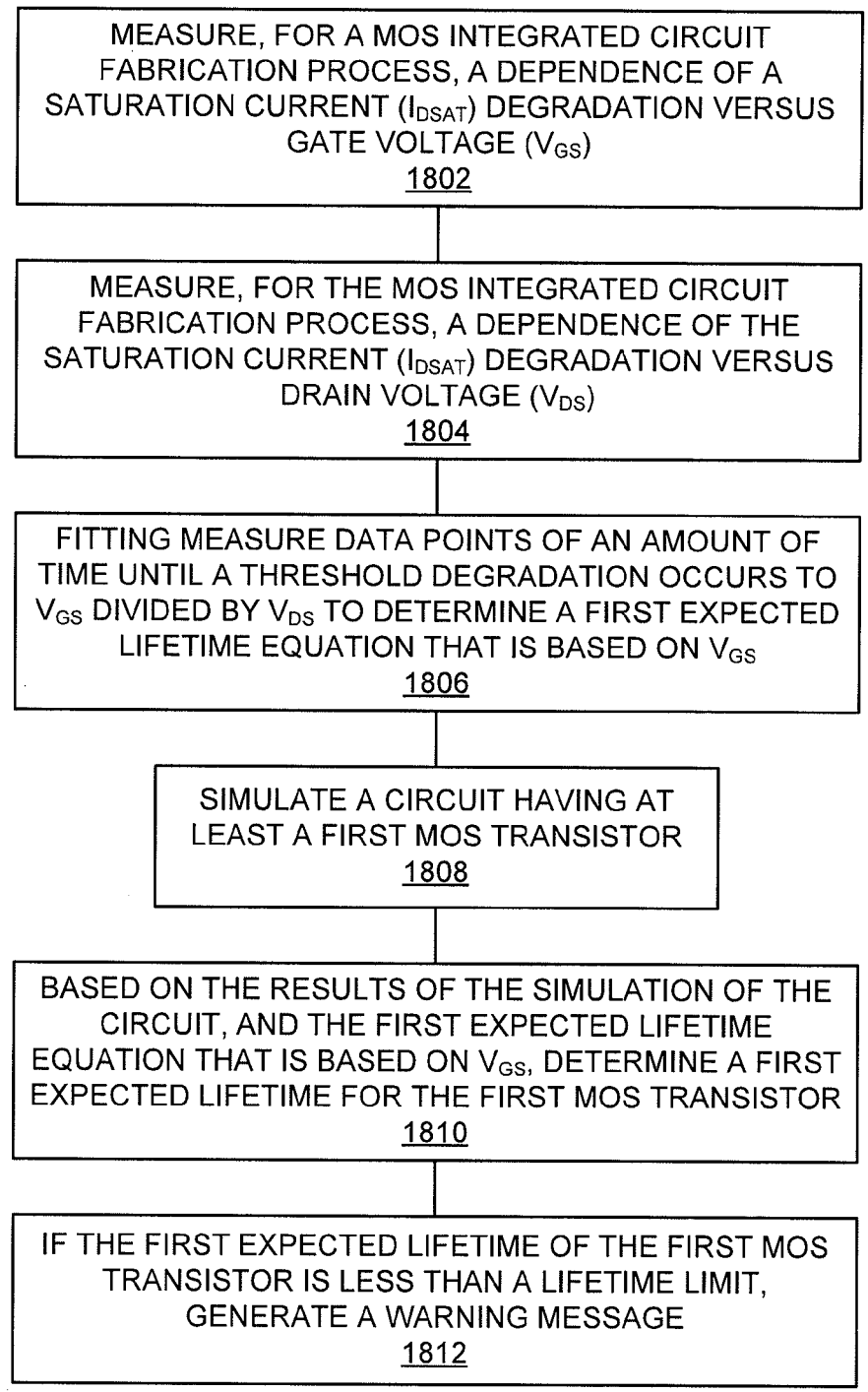
FIG. 18 is a flowchart illustrating a method of checking for gate voltage and drain voltage dependent saturation current degradation reliability problems.

FIG. 18 is a flowchart illustrating a method of checking for gate voltage and drain voltage dependent saturation current degradation reliability problems. The steps illustrated in FIG. 18 may be performed on, or for, one or more elements of IC 210. For an MOS integrated circuit fabrication process, a dependence of a saturation current ($I_{dsat}$) degradation versus gate voltage ($V_{gs}$) is measured (1802). For example, for the integrated circuit fabrication process that is to produce IC 210, the degradation of the MOS transistor characteristic parameter $I_{dsat}$ when MOS transistors fabricated in this process are exposed to various gate-to-source voltages for various lengths of time and at various temperatures, is measured. These measurements may be plotted to form saturation current degradation versus $V_{gs}$ curves.

For the MOS integrated circuit fabrication process, a dependence of a saturation current ($I_{dsat}$) degradation versus drain voltage ($V_{ds}$) is measured (1804). For example, for the integrated circuit fabrication process that is to produce IC 210, the degradation of the MOS transistor characteristic parameter $I_{dsat}$ when MOS transistors fabricated in this process are exposed to various drain-to-source voltages for various lengths of time and at various temperatures, is measured. These measurements may be plotted to form saturation current degradation versus $V_{ds}$ curves.

The measured data points are fit to of an amount of time until a threshold degradation occurs versus $V_{gs}$ divided by $V_{ds}$ to determine a first expected lifetime equation that is based on $V_{gs}$ (1806). For example, the amount of time until the measured saturation current data points reach a threshold amount of degradation (e.g., 10%) versus $V_{gs}$ divided by $V_{ds}$ may be fit to a linear, power-law, or exponential curve. This curve fit may be used produce an equation that relates, for example, $V_{gs}$ divided by $V_{ds}$, the expected lifetime of an MOS transistor.

A circuit having at least a first MOS transistor is simulated (1808). For example, circuit 215, which includes MOS transistor 211, may be simulated in order to provide results and/or information that may be used for reliability checks and/or processes. These reliability checks and/or processes may provide input(s) to the curves/equations developed in step 1806.

Based on the results of the simulation of the circuit, and the first expected lifetime equation that is based on $V_{gs}$, a first expected lifetime for the first MOS transistor is determined (1810). For example, a first expected lifetime for MOS transistor 211 may be calculated from the simulation results obtained in step 1808 (which provides $V_{gs}$ values) and the equation developed in step 1806.

If the first expected lifetime for the first MOS transistor is less than a lifetime limit, a warning message is generated. For example, if the expected lifetime of MOS transistor 211 is less than a predetermined lifetime (e.g., 10 years), a warning message can be generated. In response to the warning message, or in response to the expected lifetime of MOS transistor 211 being less than a predetermined lifetime, the design of integrated circuit 210 may be modified.

The curve developed in step 1806 may be fit for more than one region of $V_{gs}$. For example, a second expected lifetime equation may be developed. The first expected lifetime equation may be used for a first range of $V_{gs}$ values while the second expected lifetime equation is used for a second range of $V_{gs}$ values. In other words, the first expected lifetime equation may be used for $V_{gs} < V_{EQ1}$, and the second expected lifetime equation is used for $V_{gs} > V_{EQ2}$, where $V_{EQ2}$ is a predetermined value. The second expected lifetime equation may be used to determine an expected lifetime for a second MOS transistor. For example, based on simulation results that indicate MOS transistor 212 will be have $V_{gs} > V_{EQ2}$, the second expected lifetime equation may be used to determine a second expected lifetime. If the expected lifetime of MOS transistor 212 is less than a predetermined lifetime (e.g., 10 years), a warning message can be generated. The expected lifetime(s) may also be adjusted to account for bias temperature instability (BTI) such that the degradation from BTI is not double counted in the lifetime equation (s) and/or the expected lifetime(s).

Another expected lifetime of the first MOS transistor may be determined based on $V_{gb}$, a temperature parameter, the length of the channel of the first MOS transistor, $V_{gs}$, and, $V_{ds}$. For example, an expected lifetime of an MOS transistor in IC 210 may be determined based on gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage that are obtained from the simulation results. This expected lifetime may be used in combination with the expected lifetime obtained in step 1810 to determine an expected lifetime of the integrated circuit 210. If the expected lifetime of the integrated circuit, either due to the dependence of HCI on gate voltage, or the expected lifetime of the MOS transistor calculated in step 1810, or both, is less than a predetermined lifetime, the design of integrated circuit 210 may be modified.

Figure 19:
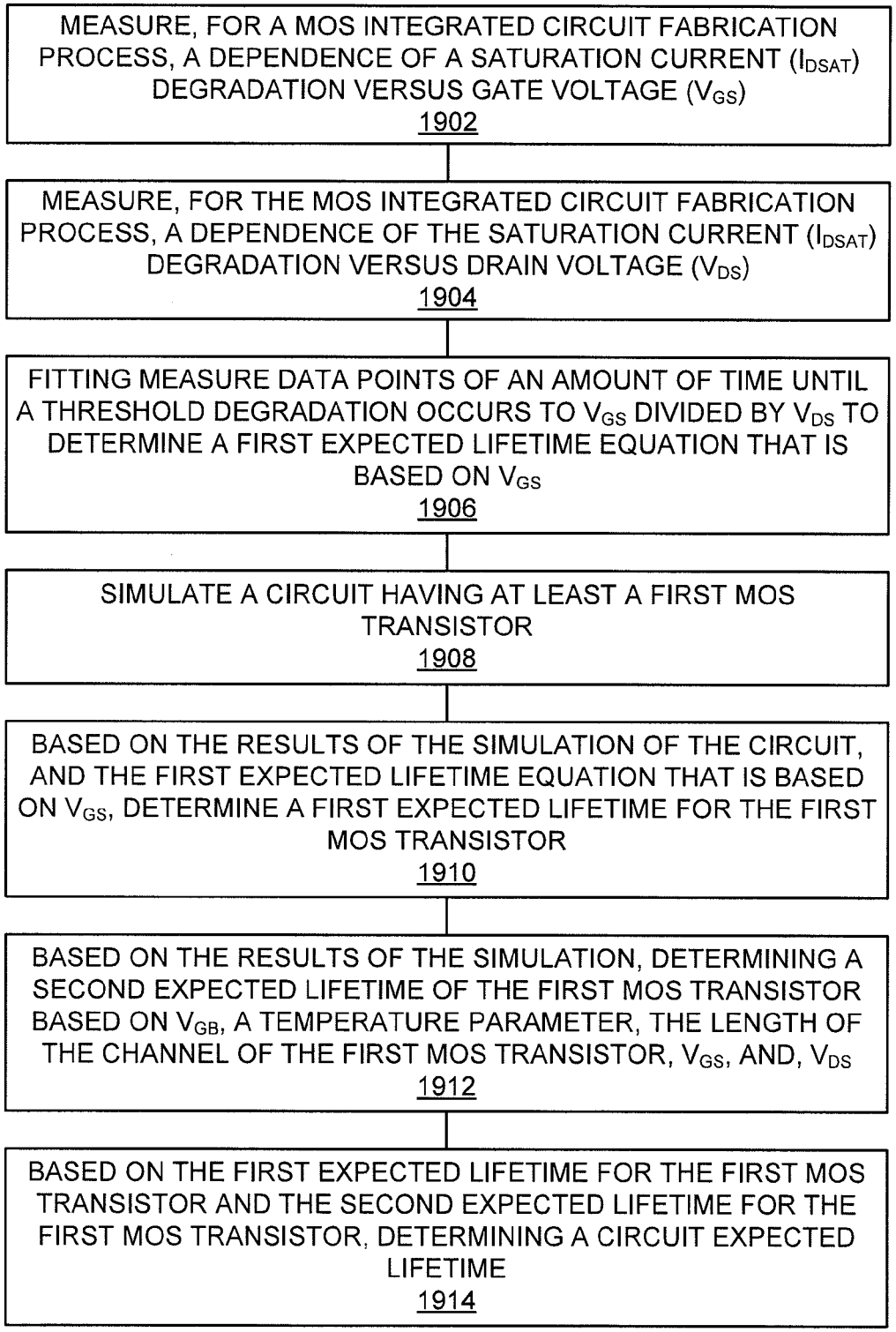
FIG. 19 is a flowchart illustrating a method of determining an expected lifetime of an integrated circuit.

FIG. 19 is a flowchart illustrating a method of determining an expected lifetime of an integrated circuit. The steps illustrated in FIG. 19 may be performed on, or for, one or more elements of IC 210. For an MOS integrated circuit fabrication process, a dependence of a saturation current ($I_{dsat}$) degradation versus gate voltage ($V_{gs}$) is measured (1902). For example, for the integrated circuit fabrication process that is to produce IC 210, the degradation of the MOS transistor characteristic parameter $I_{dsat}$ when MOS transistors fabricated in this process are exposed to various gate-to-source voltages for various lengths of time and at various temperatures, is measured. These measurements may be plotted to form saturation current degradation versus $V_{gs}$ curves.

For the MOS integrated circuit fabrication process, a dependence of a saturation current ($I_{dsat}$) degradation versus drain voltage ($V_{ds}$) is measured (1904). For example, for the integrated circuit fabrication process that is to produce IC 210, the degradation of the MOS transistor characteristic parameter $I_{dsat}$ when MOS transistors fabricated in this process are exposed to various drain-to-source voltages for various lengths of time and at various temperatures, is measured. These measurements may be plotted to form saturation current degradation versus $V_{ds}$ curves.

The measured data points are fit to of an amount of time until a threshold degradation occurs versus $V_{gs}$ divided by $V_{ds}$ to determine a first expected lifetime equation that is based on $V_{gs}$ (1906). For example, the amount of time until the measured saturation current data points reach a threshold amount of degradation (e.g., 10%) versus $V_{gs}$ divided by $V_{ds}$ may be fit to a linear, power-law, or exponential curve. This curve fit may be used produce an equation that relates, for example, $V_{gs}$ divided by $V_{ds}$, the expected lifetime of an MOS transistor.

A circuit having at least a first MOS transistor is simulated (1908). For example, circuit 215, which includes MOS transistor 211, may be simulated in order to provide results and/or information that may be used for reliability checks and/or processes. These reliability checks and/or processes may provide input(s) (such as $V_{gs}$ and/or $V_{ds}$) to the curves/equations developed in step 1906.

Based on the results of the simulation of the circuit, and the first expected lifetime equation that is based on $V_{gs}$, a first expected lifetime for the first MOS transistor is determined (1910). For example, a first expected lifetime for MOS transistor 211 may be calculated from the simulation results obtained in step 1908 (which provides $V_{gs}$ values) and the equation developed in step 1906.

Based on the results of the simulation, determine a second expected lifetime of the first MOS transistor based on gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage, an expected lifetime of a first MOS transistor is determined (1912). For example, an expected lifetime of the first MOS transistor in IC 210 or IC 1110 may be calculated according the equation and pseudo-code given in Table 1 using variables obtained from the simulation performed in step 1908.

Based on the first expected lifetime for the first MOS transistor and the second expected lifetime for the first MOS transistor, determining a circuit expected lifetime (1914). For example, based on the expected lifetime of MOS transistor 211 calculated in step 1910, and the expected lifetime of MOS transistor 211 calculated in step 1912, an expected lifetime for circuit 215 may be calculated. Based on the expected lifetime for circuit 215, an expected lifetime for integrated circuit 210 may be calculated. If the expected lifetime of the integrated circuit is less than a predetermined lifetime, the design of the integrated circuit may be modified.

Figure 20:
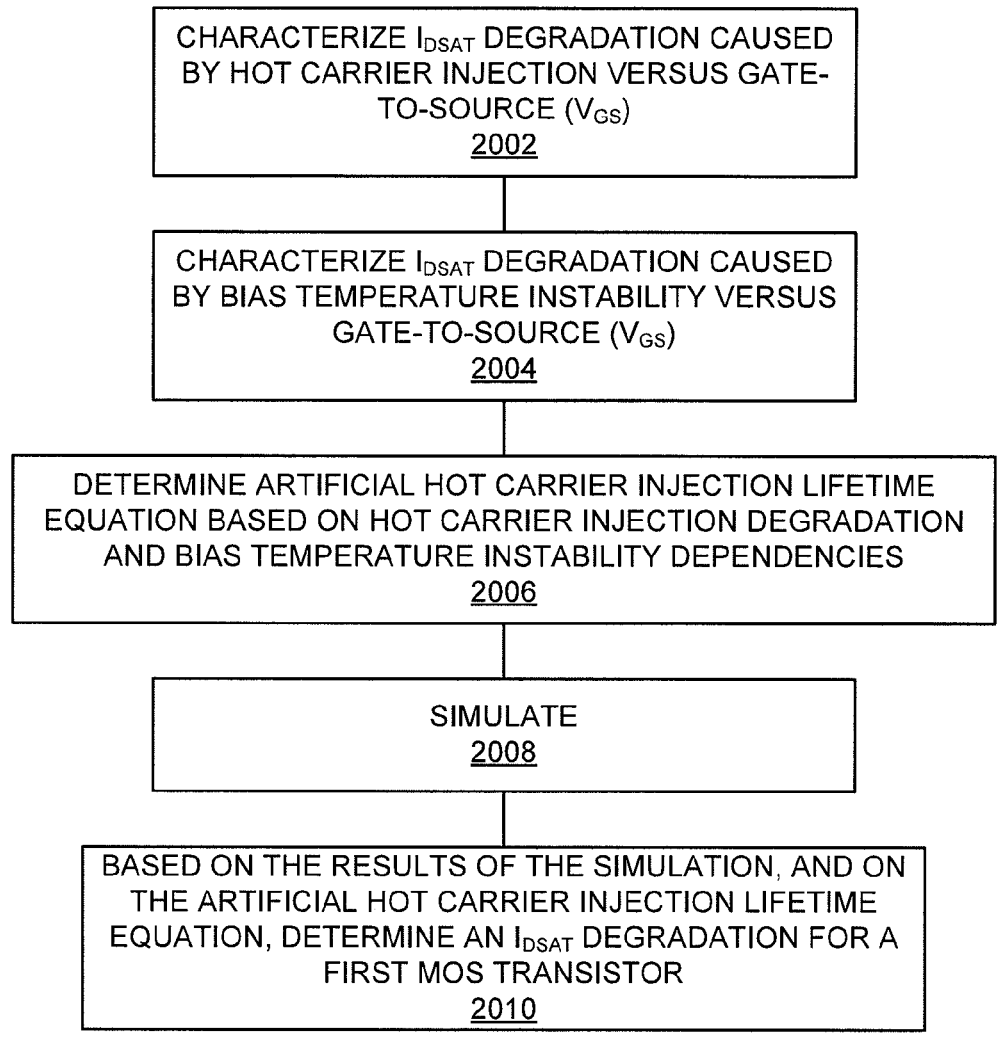
FIG. 20 is a flowchart illustrating a method of calculating a saturation current degradation due to measured effects of the interaction of bias temperature instability and hot carrier injection.

FIG. 20 is a flowchart illustrating a method of calculating a saturation current degradation due to measured effects of the interaction of bias temperature instability and hot carrier injection. The steps illustrated in FIG. 20 may be performed on, or for, one or more elements of IC 210. Saturation current ($I_{dsat}$) degradation caused by hot carrier injection (HCI) versus gate-to-source voltage ($V_{gs}$) is characterized (2002). For example, for the integrated circuit fabrication process that is to produce IC 210, the degradation of the MOS transistor characteristic parameter $I_{dsat}$ when MOS transistors fabricated in this process are exposed to various gate-to-source voltages, drain-to-source voltages, temperatures, etc., that cause degradation of $I_{dsat}$ due to hot carrier injection are measured. These measurements may be plotted to form saturation current degradation curves that correspond to degradation in $I_{dsat}$ caused by hot carrier injection.

Saturation current ($I_{dsat}$) degradation caused bias temperature instability (BTI) versus gate-to-source voltage ($V_{gs}$) is characterized (2004). For example, for the integrated circuit fabrication process that is to produce IC 210, the degradation of the MOS transistor characteristic parameter $I_{dsat}$ when MOS transistors fabricated in this process are exposed to various gate-to-source voltages, drain-to-source voltages, temperatures, etc., that cause degradation of $I_{dsat}$ due to bias temperature instability are measured. These measurements may be plotted to form saturation current degradation curves that correspond to degradation in $I_{dsat}$ caused by bias temperature instability.

An artificial hot carrier injection lifetime equation that is based on hot carrier injection degradation and bias temperature instability dependencies is determined (2006). For example, an artificial hot carrier injection lifetime equation may be determined by combining curve fitted equations to the measured data points from steps 2002 and 2004. For example, these curve fitted equations may be summed, subtracted, or fitted as a two-dimensional surface, as appropriate to determine an artificial hot carrier injection lifetime equation that does not double count degradation caused by bias temperature instability.

A circuit is simulated (2008). For example, circuit 215 may be simulated in order to provide results and/or information that may be used for reliability checks and/or processes. These reliability checks and/or processes may provide input(s) to the artificial hot carrier injection lifetime curves/equations developed in step 2006. Based on the results of the simulation, and on the artificial hot carrier injection lifetime equation, an $I_{dsat}$ degradation is determined for a first MOS transistor (2010). For example, based on the results of simulating circuit 215 in step 2008 providing input values to the artificial hot carrier injection equation developed in step 2006, a degradation of the saturation current and/or an expected lifetime of a first MOS transistor in circuit 215 is calculated. In this manner, the degradation caused by bias temperature instability is not double-counted when calculating, for example, the degradation of the saturation current and/or an expected lifetime of MOS transistor 211.

FIG. 21 is a flowchart illustrating a method of calculating an expected saturation current degradation. The steps illustrated in FIG. 21 may be performed on, or for, one or more elements of IC 210. For an MOS integrated circuit fabrication process, a dependence of a saturation current ($I_{dsat}$) degradation versus gate voltage ($V_{gs}$) that is indicative of $I_{dsat}$ degradation caused by hot carrier injection is measured (2102). For example, for the integrated circuit fabrication process that is to produce IC 210, the degradation of the MOS transistor characteristic parameter $I_{dsat}$ when MOS transistors fabricated in this process are exposed to various gate-to-source voltages, various lengths of time, various temperatures, etc. that cause hot carrier injection degradation of $I_{dsat}$, is measured. These measurements may be plotted to form saturation current degradation caused by hot carrier injection versus $V_{gs}$ curves.

For an MOS integrated circuit fabrication process, a dependence of a saturation current ($I_{dsat}$) degradation versus gate voltage ($V_{gs}$) that is indicative of $I_{dsat}$ degradation caused by bias temperature instability is measured (2104). For example, for the integrated circuit fabrication process that is to produce IC 210, the degradation of the MOS transistor characteristic parameter $I_{dsat}$ when MOS transistors fabricated in this process are exposed to various gate-to-source voltages, various lengths of time, various temperatures, etc. that cause bias temperature instability degradation of $I_{dsat}$, is measured. These measurements may be plotted to form saturation current degradation caused by bias temperature instability versus $V_{gs}$ curves.

An artificial HCI lifetime equation that is based on the second dependence subtracted from the first dependence is determined (2106). For example, an artificial hot carrier injection lifetime equation may be determined by subtracting a first curve fitted equation corresponding to the data measured in steps 2104 from a first curve fitted equation corresponding to the data measured in steps 2102.

A circuit having at least a first MOS transistor is simulated (2108). For example, circuit 215 may be simulated in order to provide results and/or information that may be used for reliability checks and/or processes. These reliability checks and/or processes may provide input(s) (such as $V_{gs}$ and/or $V_{ds}$) to the artificial hot carrier injection lifetime curves/equations developed in step 2106. Based on the results of the simulation, and on the artificial hot carrier injection lifetime equation, an $I_{dsat}$ degradation is determined for the first MOS transistor (2110). For example, based on the results of simulating circuit 215 in step 2108 providing input values to the artificial hot carrier injection equation developed in step 2106, a degradation of the saturation current and/or an expected lifetime of a first MOS transistor in circuit 215 is calculated. In this manner, the degradation caused by bias temperature instability is not double-counted when calculating, for example, the degradation of the saturation current and/or an expected lifetime of MOS transistor 211.

Figure 22:
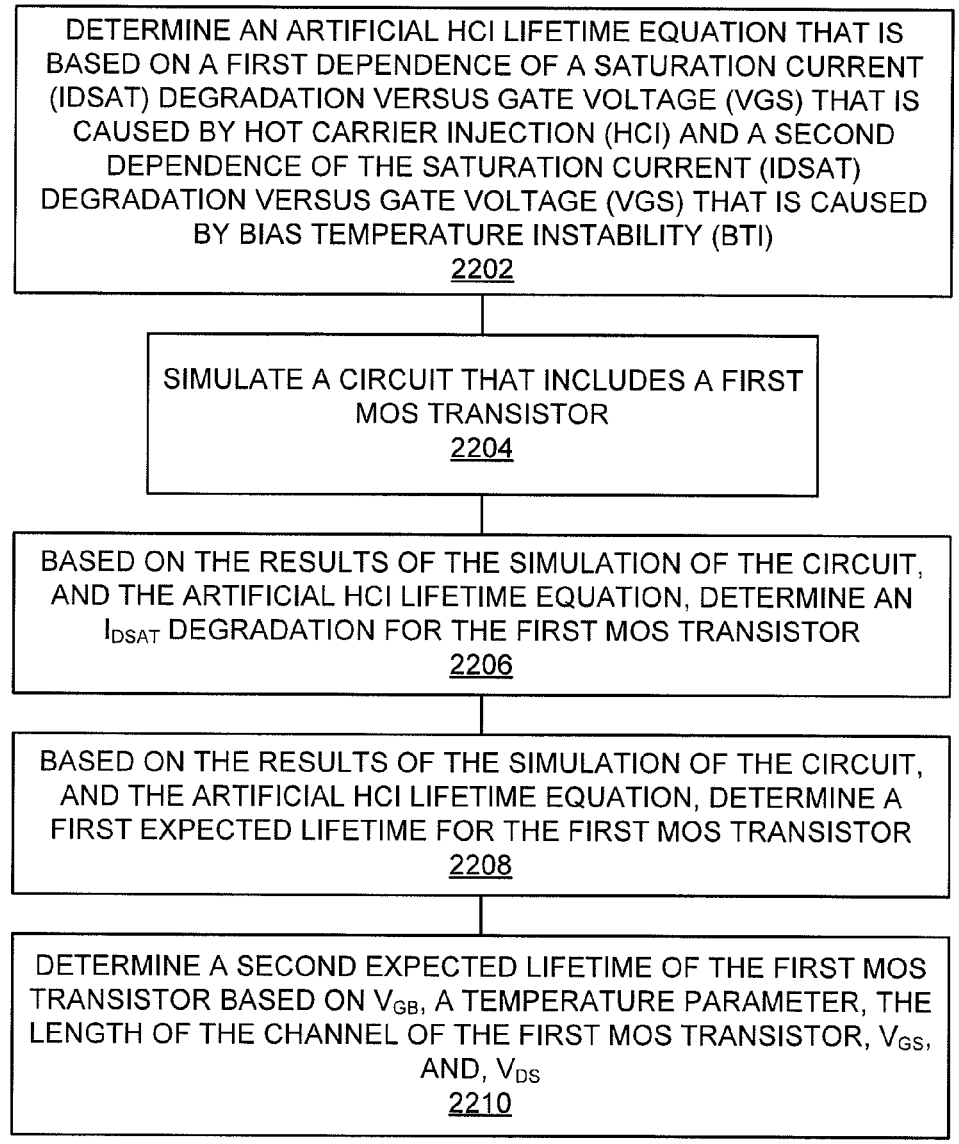
FIG. 22 is a flowchart illustrating a method of determining an expected lifetime of an integrated circuit.

FIG. 22 is a flowchart illustrating a method of calculating an expected saturation current degradation. The steps illustrated in FIG. 21 may be performed on, or for, one or more elements of IC 210. An artificial HCI lifetime equation that is based on a first dependence of a saturation current ($I_{dsat}$) degradation caused by hot carrier injection (HCI) versus gate voltage ($V_{gs}$) and a second dependence of the saturation current ($I_{dsat}$) degradation caused by bias temperature instability (BTI) versus gate voltage ($V_{gs}$) is determined (2202). For example, based on measurements of $I_{dsat}$ degradations caused by HCI and BTI versus $V_{gs}$, on MOS transistors fabricated in the process to be used to fabricate circuit 215, an artificial HCI lifetime equation can be calculated.

A circuit having at least a first MOS transistor is simulated (2204). For example, circuit 215 may be simulated in order to provide results and/or information that may be used for reliability checks and/or processes. These reliability checks and/or processes may provide input(s) to the artificial hot carrier injection lifetime curve/equation developed in step 2202. Based on the results of the simulation of the circuit, and on the artificial hot carrier injection lifetime equation, an $I_{dsat}$ degradation is determined for the first MOS transistor (2206). For example, based on the results of simulating circuit 215 in step 2204 providing input values to the artificial hot carrier injection equation developed in step 2202, a degradation of the saturation current and/or an expected lifetime of a first MOS transistor (e.g., MOS transistor 211) in circuit 215 is calculated.

Based on the results of the simulation of the circuit, and on the artificial hot carrier injection lifetime equation, first expected lifetime is determined for the first MOS transistor (2208). For example, based on the results of simulating circuit 215 in step 2204 providing input values to the artificial hot carrier injection equation developed in step 2202, an expected lifetime for the first MOS transistor (e.g., MOS transistor 211) in circuit 215 is calculated. A second expected lifetime of the first MOS transistor based on gate-to-bulk voltage(s) ($V_{gb}$), a temperature parameter (T), the length of the channel of the MOS transistor (L), a determined to gate-to-source voltage ($V_{gs}$), and, a determined drain-to-source ($V_{ds}$) voltage, an expected lifetime of a first MOS transistor is determined based on the results of the simulation (2210). For example, an expected lifetime of the first MOS transistor in IC 210 may be calculated according the equation and pseudocode given in Table 1 using variables obtained from the simulation performed in step 2204.

The first expected lifetime for the first MOS transistor and the second expected lifetime for the first MOS transistor, may be used to calculate a circuit expected lifetime. For example, based on the expected lifetime of MOS transistor 211 calculated in step 2208, and the expected lifetime of MOS transistor 211 calculated in step 2210, an expected lifetime for circuit 215 may be calculated. Based on the expected lifetime for circuit 215, an expected lifetime for integrated circuit 210 may be calculated. If the expected lifetime of the integrated circuit is less than a predetermined lifetime, the design of the integrated circuit may be modified.

Figure 23:
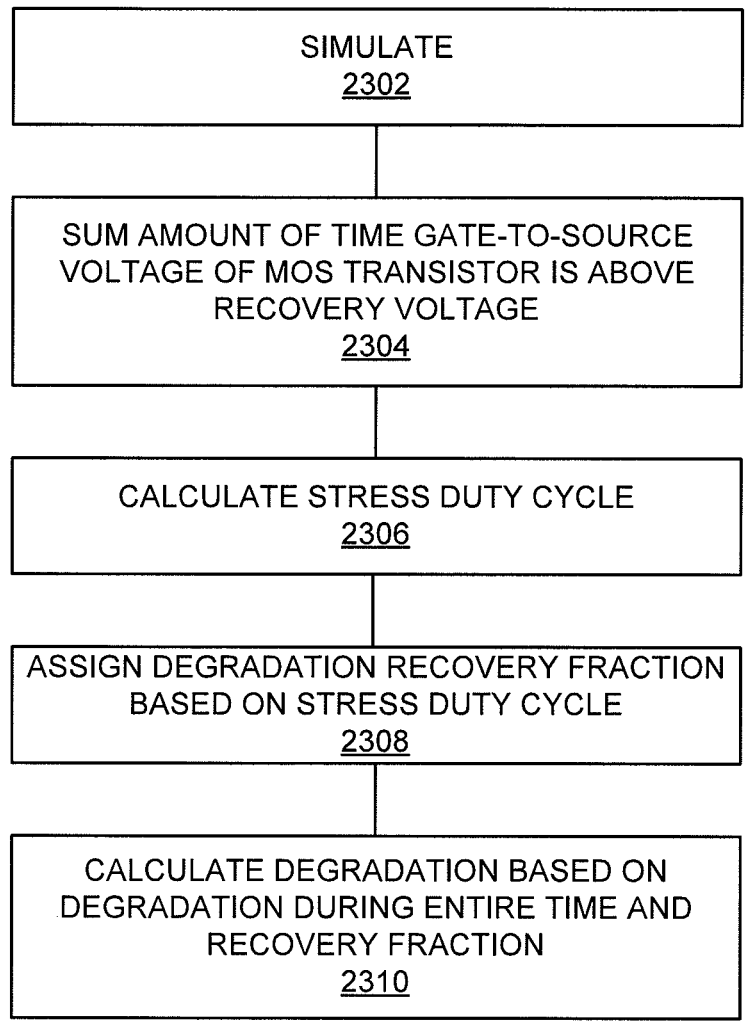
FIG. 23 is a flowchart illustrating a method of calculating saturation current recovery from bias temperature instability.

FIG. 23 is a flowchart illustrating a method of calculating saturation current recovery from bias temperature instability. The steps illustrated in FIG. 23 may be performed on, or for, one or more elements of IC 210. A circuit is simulated (2302). For example, circuit 215 may be simulated in order to provide results and/or information that may be used for reliability checks and/or processes. The amount of time the gate-to-source voltage of a MOS transistor is above a recovery voltage is summed (2304). For example, a transient analysis of circuit 215 may be performed in step 2302. The results of this transient analysis may be used to determine when, and for how long, the gate-to-source voltage of MOS transistor 211 is above a predetermined recovery voltage ($V_{rec}$).

A stress duty cycle is calculated (2306). For example, the amount of time the gate-to-source voltage of MOS transistor 211 is above the predetermined recovery voltage ($V_{rec}$) divided by the total time represented by the simulation may be used to determine a stress duty cycle. The stress duty cycle is indicative of the percentage of time that a MOS transistor is being stressed and therefore being degraded. At the other times (i.e., when the gate-to-source voltage of MOS transistor 211 is below $V_{rec}$), the MOS transistor may be recovering. In other words, when the gate-to-source voltage of MOS transistor 211 is below $V_{rec}$, the degradations caused by the gate-to-bulk voltage of MOS transistor 211 being above $V_{rec}$ are, at least partially, being reversed.

A degradation recovery fraction is assigned base on the stress duty cycle (2308). For example, a degradation recovery fraction may be assigned to MOS transistor 211 based on the calculated stress duty cycle assigned to MOS transistor 211 in step 2306. A degradation is calculated based on the degradation during the entire time and the recovery fraction (2310). For example, based on a degradation calculated for MOS transistor 211, and the recovery fraction assigned to MOS transistor 211 in step 2308, a new degradation is calculated. This new degradation is typically less than the original degradation.

Figure 24:
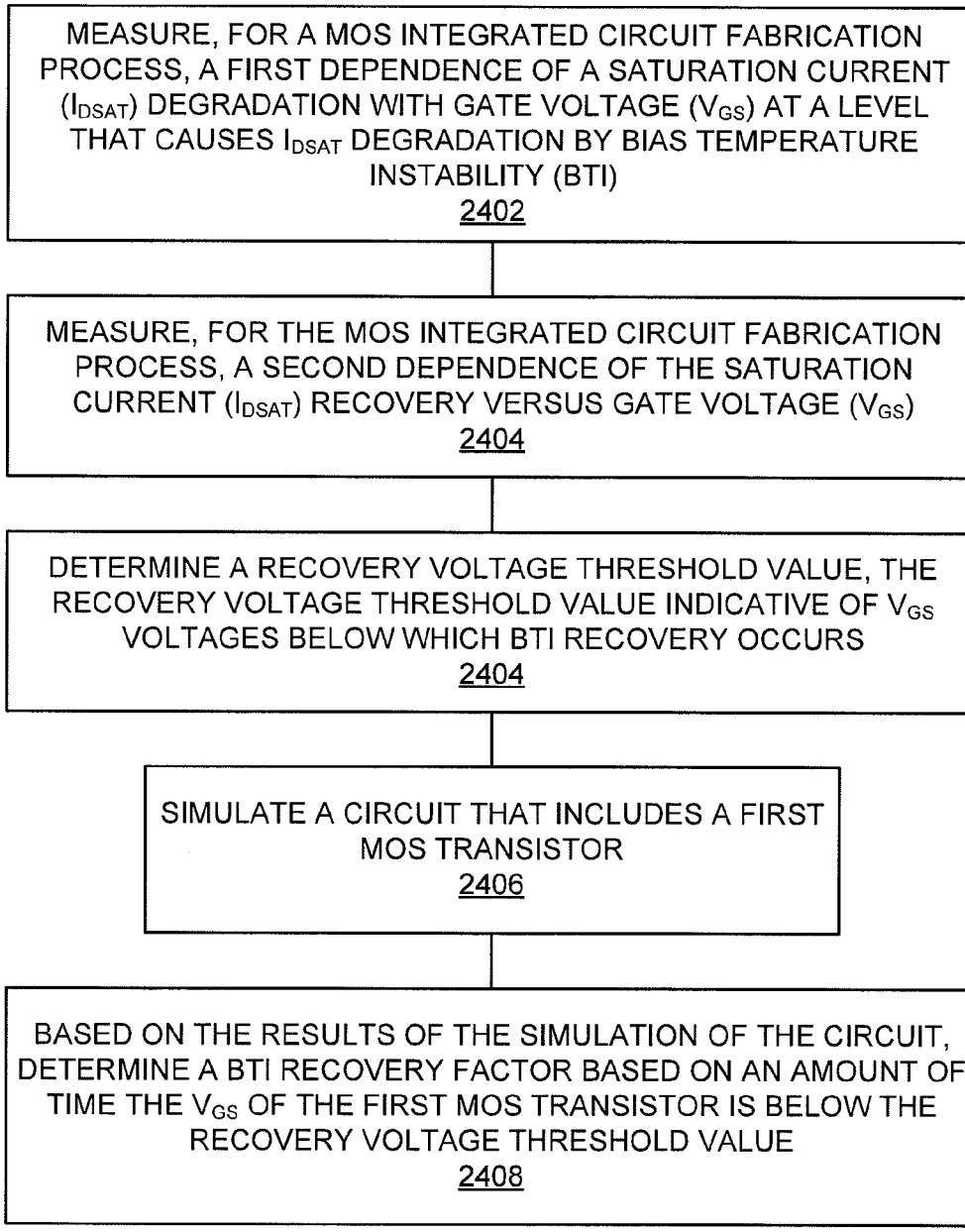
FIG. 24 is a flowchart illustrating a method of determining a saturation current degradation.

FIG. 24 is a flowchart illustrating a method of determining a saturation current degradation. The steps illustrated in FIG. 24 may be performed on, or for, one or more elements of IC 210. For an MOS integrated circuit fabrication process, a first dependence of a saturation current ($I_{dsat}$) degradation versus gate voltage ($V_{gs}$) at a level that causes $I_{dsat}$ degradation by bias temperature instability is measured (2402). For example, for the integrated circuit fabrication process that is to produce IC 210, the degradation of the MOS transistor characteristic parameter $I_{dsat}$ when MOS transistors fabricated in this process are exposed to various gate-to-source voltages that cause bias temperature instability degradation of $I_{dsat}$, is measured.

For an MOS integrated circuit fabrication process, a second dependence of a saturation current ($I_{dsat}$) recovery versus gate voltage ($V_{gs}$) at a level that causes $I_{dsat}$ recovery is measured (2404). For example, for the integrated circuit fabrication process that is to produce IC 210, the recovery of the MOS transistor characteristic parameter $I_{dsat}$ when MOS transistors fabricated in this process are exposed to various gate-to-source voltages that cause recovery from bias temperature instability degradation of $I_{dsat}$, is measured.

A recovery voltage threshold value is determined. The recovery voltage threshold is a value indicative of $V_{gs}$ voltages below which BTI recovery occurs (2404). For example, for the integrated circuit fabrication process that is to produce IC 210, a threshold voltage below which recovery of the MOS transistor characteristic parameter $I_{dsat}$ occurs can be determined. This threshold voltage can be determined from the measurements in step 2404. A circuit having at least a first MOS transistor is simulated (2406). For example, circuit 215 may be simulated in order to provide results and/or information that may be used for reliability checks and/or processes.

Based on the results of the simulation of the circuit, a BTI recovery factor is determined based on an amount of time the $V_{gs}$ of the first MOS transistor is below the recovery voltage threshold value (2408). For example, a previously determined BTI degradation of MOS transistor 211 can be reduced by an amount corresponding to a BTI recovery factor that corresponds to the amount of time the $V_{gs}$ of MOS transistor 211 spent below the recovery voltage threshold value ($V_{rec}$).

A stress time factor based on the amount of time the $V_{gs}$ of the first MOS transistor is above the recovery voltage threshold value may also be determined. A recovery time factor based on the amount of time the $V_{gs}$ of the first MOS transistor is below the recovery voltage threshold value may be determined. The BTI recovery factor may be based on both the stress time factor and the recovery time factor. The recovery voltage threshold value may be further based on temperature.

FIG. 25 is a flowchart illustrating a method of calculating a saturation current change. The steps illustrated in FIG. 25 may be performed on, or for, one or more elements of IC 210. A recovery voltage threshold value based on a first dependence of an MOS transistor characteristic parameter degradation to gate voltage ($V_{gs}$) at a level that causes the MOS transistor characteristic parameter degradation by bias temperature instability (BTI) and a second dependence of the MOS transistor characteristic parameter to recover based on gate voltage being at below the recovery voltage threshold is determined (2502). For example, for the integrated circuit fabrication process that is to produce IC 210, a recovery voltage threshold value can be determined from various measurements of $I_{dsat}$ degradation and $I_{dsat}$ recovery versus $V_{gs}$.

A circuit having at least a first MOS transistor is simulated (2504). For example, circuit 215 may be simulated in order to provide results and/or information that may be used for reliability checks and/or processes.

Based on the results of the simulation of the circuit, a BTI recovery factor is determined based on an amount of time the $V_{gs}$ of the first MOS transistor is below the recovery voltage threshold value (2506). For example, a previously determined BTI degradation of MOS transistor 211 can be reduced by an amount corresponding to a BTI recovery factor that corresponds to the amount of time the $V_{gs}$ of MOS transistor 211 spent below the recovery voltage threshold value ($V_{rec}$).

A stress time factor based on the amount of time the $V_{gs}$ of the first MOS transistor is above the recovery voltage threshold value may also be determined. A recovery time factor based on the amount of time the $V_{gs}$ of the first MOS transistor is below the recovery voltage threshold value may be determined. The BTI recovery factor may be based on both the stress time factor and the recovery time factor. The recovery voltage threshold value may be further based on temperature.

The methods, circuits, systems and devices described above may be implemented in computer systems, or stored by computer systems. The circuits and integrated circuits described herein may be simulated on computer systems. The reliability checks and methods described herein may be run on computer systems. The methods and systems described above may also be stored on a non-transitory computer readable medium. The methods, devices, circuits, and systems described herein may be implemented using computer-aided design tools available in the art, and embodied by computer-readable files containing software descriptions of such circuits and devices. These software descriptions may be: behavioral, register transfer, logic component, transistor, and layout geometry-level descriptions. Moreover, the software descriptions may be stored on non-transitory storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 26:
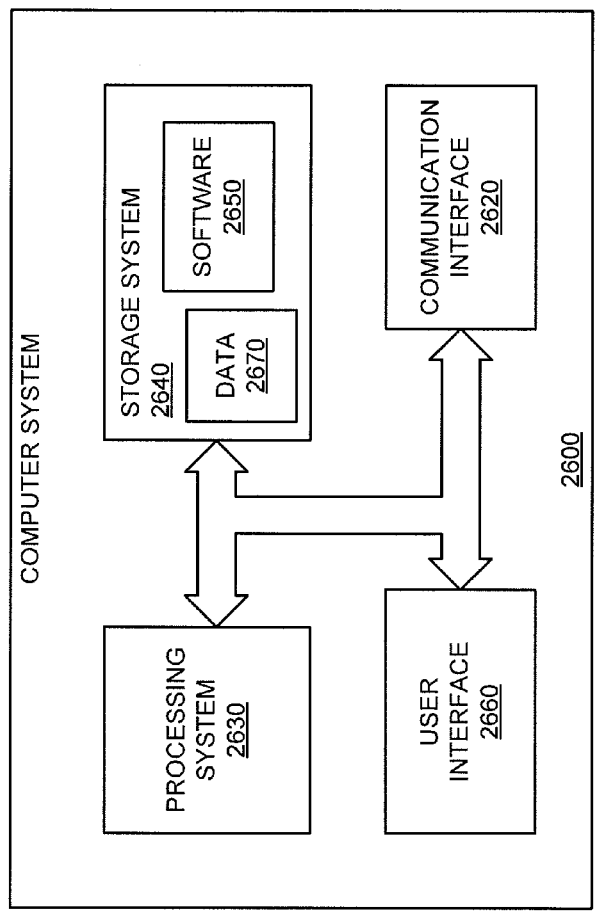
FIG. 26 is a block diagram of a computer system.

FIG. 26 illustrates a block diagram of a computer system. Computer system 2600 includes communication interface 2620, processing system 2630, storage system 2640, and user interface 2660. Processing system 2630 is operatively coupled to storage system 2640. Storage system 2640 stores software 2650 and data 2670. Processing system 2630 is operatively coupled to communication interface 2620 and user interface 2660. Computer system 2600 may comprise a programmed general-purpose computer. Computer system 2600 may include a microprocessor. Computer system 2600 may comprise programmable or special purpose circuitry. Computer system 2600 may be distributed among multiple devices, processors, storage, and/or interfaces that together comprise elements 2620-2670.

Communication interface 2620 may comprise a network interface, modem, port, bus, link, transceiver, or other communication device. Communication interface 2620 may be distributed among multiple communication devices. Processing system 2630 may comprise a microprocessor, microcontroller, logic circuit, or other processing device. Processing system 2630 may be distributed among multiple processing devices. User interface 2660 may comprise a keyboard, mouse, voice recognition interface, microphone and speakers, graphical display, touch screen, or other type of user interface device. User interface 2660 may be distributed among multiple interface devices. Storage system 2640 may comprise a disk, tape, integrated circuit, RAM, ROM, EEPROM, flash memory, network storage, server, or other memory function. Storage system 2640 may include computer readable medium. Storage system 2640 may be distributed among multiple memory devices.

Processing system 2630 retrieves and executes software 2650 from storage system 2640. Processing system 2630 may retrieve and store data 2670. Processing system 2630 may also retrieve and store data via communication interface 2620. Processing system 2630 may create or modify software 2650 or data 2670 to achieve a tangible result. Processing system 2630 may control communication interface 2620 or user interface 2660 to achieve a tangible result. Processing system may retrieve and execute remotely stored software via communication interface 2620.

Software 2650 and remotely stored software may comprise an operating system, utilities, drivers, networking software, and other software typically executed by a computer system. Software 2650 may comprise an application program, applet, firmware, or other form of machine-readable processing instructions typically executed by a computer system. When executed by processing system 2630, software 2650 or remotely stored software may direct computer system 2600 to operate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for checking for reliability problems, comprising:

receiving, by a computer system and storing on a non-transitory medium, a netlist of a circuit having at least one MOS transistor that includes a first MOS transistor, the first MOS transistor having a channel length;

based on a parameter associated with said first MOS transistor, selecting the first MOS transistor to be simulated as at least a first transistor and a second transistor in series, the first transistor and the second transistor having a first channel length and a second channel length, respectively, the first channel length and the second channel length being less than the channel length of the first MOS transistor;

simulating the circuit with the first transistor and the second transistor in place of the first MOS transistor;

based on the results of the simulation, determining a device degradation for the first transistor and a device degradation for the second transistor;

creating a degraded netlist having the first transistor degraded by the device degradation for the first transistor and having the second transistor degraded by the device degradation for the second transistor;

storing the degraded netlist on the non-transitory medium; and, simulating the circuit with the first transistor degraded by the device degradation for the first transistor and the second transistor degraded by the device degradation for the second transistor in place of the first MOS transistor.

2. The method of claim 1, wherein the parameter associated with said first MOS transistor is the channel length of the first MOS transistor.

3. The method of claim 1, wherein the first MOS transistor is selected to be simulated as at least the first transistor and the second transistor in series when the channel length of the first MOS transistor meets a threshold requirement.

4. The method of claim 1, wherein the first channel length and the second channel length are equal.

5. The method of claim 1, wherein the first MOS transistor is simulated as a plurality of transistors each with equal channel lengths.

6. The method of claim 1, further comprising:

calculating, based on the results of simulating the circuit with the first transistor and the second transistor in place of the first MOS transistor, an expected lifetime of the circuit based on expected lifetimes of the first transistor and the second transistor.

7. The method of claim 6, wherein the expected lifetimes of the first transistor and the second transistor are based on simulated drain-to-source voltage values on the first transistor and the second transistor.

8. A method for transmitting a program of instructions executable by a computer to perform a process of checking for reliability problems of a circuit, said method comprising:

causing the transmission to a client device a program of instructions, thereby enabling the client device to perform, by means of such program, a process of checking for reliability problems of a circuit, comprising:

receiving, by the client device and storing on a non-transitory medium, a netlist of a circuit having at least one MOS transistor that includes a first MOS transistor, the first MOS transistor having a channel length;

based on a parameter associated with said first MOS transistor, selecting the first MOS transistor to be simulated as at least a first transistor and a second transistor in series, the first transistor and the second transistor having a first channel length and a second channel length, respectively, the first channel length and the second channel length being less than the channel length of the first MOS transistor;

simulating the circuit with the first transistor and the second transistor in place of the first MOS transistor;

based on the results of the simulation, determining a device degradation for the first transistor and a device degradation for the second transistor;

creating and storing on the non-transitory medium, a degraded netlist having the first transistor degraded by the device degradation for the first transistor and having the second transistor degraded by the device degradation for the second transistor; and, simulating the circuit with the first transistor degraded by the device degradation for the first transistor and the second transistor degraded by the device degradation for the second transistor in place of the first MOS transistor.

9. The method of claim 8, wherein the parameter associated with said first MOS transistor is the channel length of the first MOS transistor.

10. The method of claim 8, wherein the first MOS transistor is selected to be simulated as at least the first transistor and the second transistor in series when the channel length of the first MOS transistor meets a threshold requirement.

11. The method of claim 8, wherein the first channel length and the second channel length are equal.

12. The method of claim 8, wherein the first MOS transistor is simulated as a plurality of transistors each with equal channel lengths.

13. The method of claim 1, wherein the process of checking for reliability problems of the circuit further comprises:
calculating, based on the results of simulating the circuit with the first transistor and the second transistor in place of the first MOS transistor, an expected lifetime of the circuit based on expected lifetimes of the first transistor and the second transistor.

14. The method of claim 6, wherein the expected lifetimes of the first transistor and the second transistor are based on simulated drain-to-source voltage values on the first transistor and the second transistor.

* * * * *